US011904435B2

(12) United States Patent
Linde

(10) Patent No.: US 11,904,435 B2
(45) Date of Patent: Feb. 20, 2024

(54) WATER-ABRASIVE-SUSPENSION CUTTING SYSTEM AND METHOD FOR WATER-ABRASIVE-SUSPENSION CUTTING

(71) Applicant: ANT Applied New Technologies AG, Lübeck (DE)

(72) Inventor: Marco Linde, Lübeck (DE)

(73) Assignee: ANT Applied New Technologies AG, Lübeck (DE)

( * ) Notice: Subject to any disclaimer, the term of this patent is extended or adjusted under 35 U.S.C. 154(b) by 1178 days.

(21) Appl. No.: 16/498,767

(22) PCT Filed: Mar. 31, 2017

(86) PCT No.: PCT/EP2017/057784

§ 371 (c)(1),
(2) Date: Sep. 27, 2019

(87) PCT Pub. No.: WO2018/177557

PCT Pub. Date: Oct. 4, 2018

(65) Prior Publication Data

US 2021/0101255 A1 Apr. 8, 2021

(51) Int. Cl.
*B24C 1/04* (2006.01)
*B24C 7/00* (2006.01)
(Continued)

(52) U.S. Cl.
CPC ............ *B24C 1/045* (2013.01); *B24C 7/0007* (2013.01); *B24C 5/04* (2013.01); *B26F 3/004* (2013.01)

(58) Field of Classification Search
CPC ... B24C 7/0007; B24C 7/0015; B24C 7/0023; B24C 7/003; B24C 7/0084; B24C 3/02; B24C 3/04; B24C 1/045; B26F 3/004
See application file for complete search history.

(56) References Cited

U.S. PATENT DOCUMENTS 3,521,407 A * 7/1970 Nalley ...................... B24C 7/00 451/101
5,201,150 A * 4/1993 Kuboyama ........... B24C 7/0038 451/100

(Continued)

FOREIGN PATENT DOCUMENTS

EP 1 199 136 A1 4/2002
EP 1 208 944 A1 5/2002

(Continued)

*Primary Examiner* — Joel D Crandall
(74) *Attorney, Agent, or Firm* — McGlew and Tuttle, P.C.

(57) ABSTRACT

A water-abrasive suspension cutting facility includes a high-pressure source (3) for providing (301) water at a high pressure, a high-pressure conduit (5) which is connected to the high-pressure source (3), a pressure tank for providing (303) a water-abrasive agent suspension (13) which is at a high pressure, a lock chamber (21) which is designed to temporarily be at a high pressure and temporarily at a low pressure, and a filling valve (23) for filling (311) the lock chamber when this is at a low pressure. A pump (31) at the suction side is fluid-connected to the lock chamber in a manner capable of being shut off, in a manner such that given high pressure in the lock chamber (21) the pump is shut off from this and given low pressure in the lock chamber (21) the pump is in the position of sucking an abrasive agent suspension through the filling valve (23) into the lock chamber (21).

16 Claims, 19 Drawing Sheets

(51) Int. Cl.

| | |
|---|---|
| ***B24C 5/04*** | (2006.01) |
| ***B26F 3/00*** | (2006.01) |

(56) References Cited

U.S. PATENT DOCUMENTS

| | | | | |
|---|---|---|---|---|
| 6,059,641 | A * | 5/2000 | Okamoto | B65G 53/4691<br>451/100 |
| 2005/0186888 | A1* | 8/2005 | Gadd | B24C 7/0007<br>451/36 |
| 2011/0081834 | A1* | 4/2011 | Roth | B24C 7/0007<br>451/442 |
| 2016/0339560 | A1* | 11/2016 | Hashish | B24C 1/045 |

FOREIGN PATENT DOCUMENTS

| | | | |
|---|---|---|---|
| EP | 2 755 802 | B1 | 4/2016 |
| GB | 2232620 | A | 12/1990 |
| JP | 2008136913 | A | 6/2008 |
| WO | 2007134702 | A1 | 11/2007 |
| WO | 2015/149867 | A1 | 10/2015 |

* cited by examiner

WATER-ABRASIVE-SUSPENSION CUTTING SYSTEM AND METHOD FOR WATER-ABRASIVE-SUSPENSION CUTTING

CROSS REFERENCE TO RELATED APPLICATIONS

This application is a United States National Phase Application of International Application PCT/EP2017/057784 filed Mar. 31, 2017, the entire contents of which are incorporated herein by reference.

FIELD OF THE INVENTION

The present disclosure relates to a water-abrasive suspension cutting facility and to a method for water-abrasive suspension cutting.

BACKGROUND OF THE INVENTION

Water-abrasive suspension cutting facilities are used for cutting materials by way of a high-pressure water jet, to which an abrasive agent is added. Water-abrasive suspension cutting facilities are to be differentiated from water-abrasive injection cutting facilities, concerning which the abrasive agent is not introduced into the already greatly accelerated water until or at an exit nozzle. Concerning water-abrasive suspension cutting facilities, the water which is at a high pressure is firstly mixed with the abrasive agent and the water-abrasive suspension is then accelerated in the exit nozzle. With regard to water-abrasive injection cutting facilities, although there is not the problem of mixing the abrasive agent with the water at a high pressure since the abrasive agent is not fed until at the exit nozzle, the abrasive agent-water ratio however is very limited with regard to water-abrasive injection cutting facilities and herewith its cutting force. Furthermore, in the case of water-abrasive injection cutting facilities, entrapped air leads to a reduction of the cutting performance due to the ineffective acceleration of the abrasive agent particles on being sucked into the water jet, as well as to high air components in the cutting jet. In contrast, with water-abrasive suspension cutting facilities, the abrasive agent-water ratio can be selected higher and a higher cutting force can be achieved since the water is mixed with the abrasive agent in a controlled manner and at high pressure upstream of the exit nozzle without entrapped air. Thus for example a part of the water flow can be led through an abrasive agent container which is designed as a pressure tank. Such a facility is known from EP 1 199 136. With regard to these facilities, the refilling of the abrasive agent is a technical challenge, since for this the facility must be taken out of operation, the abrasive agent container must be brought into a pressureless state and only then can it be filled. However, in the case of industrial applications a continuous cutting is often desired, with regard to which the facility does not need to be taken out of operation for filling the abrasive agent.

EP 2 755 802 B1 and WO 2015/149867A1 describe lock solutions, in order to ensure a continuous operation of the facility. Due to the particularly high pressures to some extent above 2000 bar, the cyclical pressurization and depressurization of a lock chamber however is somewhat of a technical challenge. In particular, the adjustment of the desired mixing ratio between water and abrasive agent in the cutting jet has been found to be difficult with the known facilities.

SUMMARY OF THE INVENTION

The water-abrasive suspension cutting facility which is disclosed herein and the water-abrasive suspension cutting method which is disclosed herein, compared to known solutions, have the advantage that the filling of the lock chamber takes place more rapidly and the risk of blockages is minimized.

According to a first aspect of the disclosure, a water-abrasive suspension cutting facility is provided, with

- a high-pressure source for providing water at a high pressure,
- a high-pressure conduit which is connected to the high-pressure source,
- a pressure tank for providing a water-abrasive agent suspension which is at a high pressure,
- a lock chamber which is designed to temporarily be at a high pressure and temporarily at a low pressure, and
- a filling valve for filling the lock chamber when this is at a low pressure, characterized in that a pump at the suction side is fluid-connected to the lock chamber in a manner capable of being shut off such that given high pressure in the lock chamber the pump is shut off from this and given low pressure in the lock chamber the pump is in the position of sucking an abrasive agent suspension through the filling valve into the lock chamber.

Herein, a “high pressure” is to indicate a pressure above 100 bar and “low pressure” a pressure below 100 bar. The low pressure is preferably the ambient pressure. The pump which is capable of being shut off is preferably not subjected to high pressure and can therefore be designed in the form of a membrane pump for low pressure. Even though the pump is fluid-connected where possible to a region of the lock chamber, in which less abrasive agent is located, for example in a lateral upper region of the lock chamber, the pumped water can comprise abrasive agent, which encourages a wearing of the pump. If the pump were to be subjected to the high pressure, then this wearing of the pump would be a multiple higher.

Optionally, a pump shut-off valve is arranged between the pump and the lock chamber, said pump shut-off valve preferably being a needle valve which is preferably designed in a purgable (flushable) manner. The needle valve can be shut off pneumatically via a pressing disc. The needle can herein be arranged coaxially to a high-pressure entry and lying opposite this, in order to sealingly press onto a valve seat on the high-pressure entry. A purge inlet can lead laterally to the valve seat in a manner lying opposite the low pressure exit, so that a purging agent flow can run from the purge inlet via the valve seat to the low-pressure exit, in order to hence clean the valve seat and the needle tip from abrasive agent residues, preferably before a closure of the valve.

In order to create a circulation, the pump can optionally be connected to a refilling funnel at the delivery side, said refilling funnel at the exit side being fluid connected to the entry side of the filling valve. Herein, the refilling funnel is preferably arranged above the filling valve, so that abrasive agent assisted by gravity can sink through the filling valve into the lock chamber. The pump can push, assist and/or accelerate this vertical abrasive agent flow by way of a vacuum which is at least temporarily produced by it in the lock chamber. The water which is displaced by the abrasive agent and which is pumped away out of the lock chamber by the pump can be fed again to the refilling funnel via the circulation. If the refilling funnel is closed at least during the refilling of the lock chamber, then the pump with the exit-side pressure can produce a corresponding overpressure in the refilling funnel and thus increase the pressure difference between the refilling funnel and the lock chamber, which can accelerate the flow through the filling valve.

Optionally, the pump at the suction side is fluid-connected to an upper region of the lock chamber in a manner capable of being shut off, in order as much as possible to only deliver clear water without abrasive agent. A filter or separator can also be provided, in order to minimize the burdening of the pump with abrasive agent. Since the abrasive agent which flows in the lock chamber settles in the lower region in the form of a cone up to a certain height, a connection to the pump is preferably arranged laterally at the top where as little as possible abrasive agent is located. Apertures or impact plates can be provided in the lock chamber, in order to prevent a sucking of abrasive agent to the pump as much as possible. Optionally, the pump can be a membrane pump which merely needs to be designed for operation at low pressure.

Optionally, the lock chamber can be relieved of pressure via a pressure relief valve in the form of a purgable needle valve. Similarly to a pump shut-off valve, the pressure relief valve wears to a lesser exit and closes better if it is designed such that it can be purged. In contrast to the pump shut-off valve, the pressure relief valve however must open whilst a high pressure prevails at a high-pressure entry of the valve. For this reason, it is advantageous if the pressure relief valve comprises a check valve at a purge inlet, so that the high pressure cannot discharge into the purge inlet, but only into a low pressure exit which can be fluid-connected to a discharge.

According to a second aspect of this disclosure, a method for the water-abrasive suspension cutting is provided, with the following steps:

- providing water at a high pressure in a high-pressure conduit by way of a high-pressure source,
- providing an abrasive agent suspension which is at a high pressure in a pressure tank,
- cutting a material by way of a high-pressure jet which at least partly comprises the abrasive agent suspension, amid the removal of the abrasive agent suspension from the pressure tank,
- filling a lock chamber which is at a low pressure with abrasive agent amid at least temporal sucking of an abrasive agent suspension into the lock chamber by way of a pump which can be shut off from the lock chamber,
- shutting off the pump from the lock chamber,
- pressurizing the lock chamber to a high pressure, and
- refilling the pressure tank with abrasive agent from the lock chamber which is at high pressure, into the pressure tank.

Optionally, the shutting-off of the pump from the lock chamber is effected by a pump shut-off valve in the form of a needle valve. The valve wear and the sealedness of the valve can be improved by way of a further step of purging this pump shut-off valve which given an opened valve can preferably take place shortly before the shutting-off.

The filling, shutting-off, pressurizing and refilling can take their course subsequently to one another and cyclically during a continuous cutting, in order to ensure a continuous cutting operation of the facility.

Optionally, a pressure relief of the lock chamber from high pressure to low pressure takes place after the refilling of the pressure tank. This is preferably effected into a discharge via a pressure relief valve in the form of a purgable needle valve.

According to an independent third aspect of the disclosure, a water-abrasive suspension cutting facility is provided with a high-pressure source for providing water at a high pressure, a high-pressure conduit which is connected to the high-pressure source, a pressure tank for providing a water-abrasive agent suspension which is at a high pressure, a lock chamber with a pressurization entry, and a filling valve for refilling abrasive agent into the pressure tank via the lock chamber. The facility further comprises a pressure accumulator which is connected to the pressurization entry of the lock chamber in a manner capable of being shut off, wherein the pressure accumulator is designed for pressure discharge into the lock chamber.

Herewith, one does not need to provide a separate high-pressure source for pressurizing the lock chamber. Instead, the energy removal from the high-pressure conduit can be spread over time, without herein lengthening the pressurization procedure for the lock chamber. The energy which is required for pressurizing the lock chamber can be taken from the high-pressure conduit for example during a filling of the pressureless lock chamber with abrasive agent or water-abrasive agent suspension and/or a refilling of the pressure tank from the pressurized lock chamber by way of a relatively slow pressure charging of the pressure accumulator via a throttle. The amplitude of the pressure drop in the high-pressure conduit can therefore be reduced to a measure, at which the cutting performance remains essentially uncompromised.

The pressurizing of the lock chamber does not need to be effected completely by way of a pressure discharge of the pressure accumulator, but for example can contribute to only 40% or 50% of the pressurization for example by way of an initial pressure impulse from the pressure accumulator into the lock chamber. The remaining pressurization can effected via the high-pressure conduit in a throttled manner simultaneously or in a temporally staggered manner. The pressure accumulator can comprise one pressure accumulator unit or several pressure accumulator units which are connected in parallel or in series.

Optionally, the pressure accumulator can be connected to the high-pressure conduit via at least one throttle and be charged in pressure via the at least one throttle. The pressure charging can be directly subsequent to the pressurizing of the lock chamber or temporally staggered thereto. For example, a shut-off valve can be provided, in order to shut off the pressure accumulator after the pressure discharge, so that the lock chamber can firstly undergo a residual pressurization from the high-pressure conduit, without loading the high-pressure conduit simultaneously with the pressurize charging of the pressure accumulator. Herewith, the amplitude of the pressure drop in the high-pressure conduit is further reduced.

Optionally, the pressurization entry can be arranged at a lower region of the lock chamber. By way of this, the pressurization entry lies below the abrasive agent level when the lock chamber is filled with abrasive agent. A pressure impulse which is introduced through the pressurization entry and which is preferably produced by the pressure discharge of the pressure accumulator can herewith loosen and swirl up abrasive agent which is located in the lock chamber. A subsequent refilling of the pressure tank with abrasive agent from the lock chamber is effected more rapidly after such a loosening and swirling.

Optionally, the pressurization entry can be connected to the high-pressure conduit via at least one throttle in a manner capable of being shut off. Herewith, the lock chamber can be pressurized at least partly via the high-pressure conduit, so as not to have to design the pressure accumulator too large or to design it with too many pressure accumulator units. To a certain extent, indeed a pressure drop in the high-pressure conduit can be tolerated, without the cutting performance being herein significantly compromised. The energy removal from the high-pressure conduit is slowed down via the at least one throttle and it is ensured that the amplitude of the pressure drop does not exceed a certain amount. Hereby, a compromise is preferably made between the speed of the pressurizing and the maximal pressure drop in the high-pressure conduit, wherein it has been found to be advantageous to rapidly produce about 40% of the pressure in the lock chamber from the pressure discharge of the pressure accumulator and the rest slowly from the high-pressure conduit. As a whole, the pressurizing process up to the complete pressure magnitude in the lock chamber can then last for example for 5 to 10 seconds.

Optionally, the lock chamber can be pressurized during a first time window by way of pressure discharge of the pressure accumulator and during a second time window from the high-pressure conduit via at least one throttle, wherein the first and the second time window at least partly overlap. Preferably, both time windows begin at the same time, by way of a first shut-off valve downstream of the pressure accumulator and of the high-pressure conduit and upstream of the pressurization entry being opened. The high-pressure conduit and an exit of the pressure accumulator can be brought together downstream of the at least one throttle, so that the pressure accumulator as well as the high-pressure conduit can pressurize the lock chamber given an opened shut-off valve. However, the first time window is significantly shorter than the second time window due to the upstream throttle. A pressure impulse for loosening up the abrasive agent can thus be introduced into the lock chamber by way of the pressure discharge of the pressure accumulator, without producing a pressure drop in the high-pressure conduit, said pressure drop compromising the cutting performance.

Optionally, a second shut-off valve can be arranged between an exit of the pressure accumulator and the high-pressure conduit, downstream of the at least one throttle. The pressure charging of the pressure accumulator after a pressure discharge procedure can be delayed with this second shut-off valve, in order not to load the high-pressure conduit during the remaining pressurization of the lock chamber. Alternatively, the pressure charging of the pressure accumulator could begin immediately at a reversal point, at which a charging pressure just exceeds the discharging pressure.

Optionally, the pressure accumulator can be a spring accumulator or a bubble accumulator.

According to an independent fourth aspect of the disclosure, a water-abrasive suspension cutting method is provided with the steps:

- providing water at a high pressure in a high-pressure conduit by way of a high-pressure source,
- providing an abrasive agent suspension which is under pressure in a pressure tank,
- cutting a material by way of a high-pressure jet which at least partly comprises the abrasive agent suspension, amid the removal of the abrasive agent suspension from the pressure tank,
- filling a non-pressurized lock chamber with abrasive agent or a water-abrasive agent suspension,
- at least partially pressurizing the lock chamber by way of a pressure discharge of a pressure accumulator, and
- refilling the pressure tank with abrasive agent or with an abrasive agent suspension from the pressurized lock chamber into the pressure tank via a filling valve.

Optionally, the method can comprise a further step of pressure charging a pressure accumulator from the high-pressure conduit via at least one throttle. One can herewith make do without an additional high-pressure source.

Optionally, the method can comprise an at least partial pressurizing of the lock chamber from the high-pressure conduit via at least one throttle. This step can at least partly overlap with the step of the at least partial pressuring of the lock chamber by way of pressure discharge of the pressure accumulator, and preferably begin at the same time as this, but preferably end later than this. As has already been described above, the pressure accumulator can herewith be designed smaller or with less pressure accumulator units than if the complete pressure of the lock chamber were to be fed from the pressure accumulator.

Optionally, the pressurizing of the lock chamber by way of pressure discharge of the pressure accumulator and/or an at least partial pressuring of the lock chamber from the high-pressure conduit via at least one throttle can be effected in a manner such that abrasive agent which is located in the lock chamber can be loosened up by a pressure impulse. On account of this, the subsequent step of refilling the pressure tank with abrasive agent from the lock chamber can be effected much more rapidly.

Optionally, the pressurizing of the lock chamber by pressure discharge of the pressure accumulator and/or the pressurizing of the lock chamber from the high-pressure conduit can be effected into a lower region of the lock chamber. Since abrasive agent drops into the lower direction of the lock chamber on account of gravity, it is herewith ensured that the abrasive agent is loosened up by a pressure impulse. Furthermore, the danger of becoming lumpy is greatest in the preferably narrowed lower region of the lock chamber which leads to the refilling valve which is preferably arranged therebelow.

Optionally, the pressurizing of the lock chamber by way of pressure discharge of a pressure accumulator can be effected during a first time window and the pressurizing of the lock chamber from the high-pressure conduit during a second time window, wherein the first and the second time window at least partly overlap.

Optionally, the lock chamber can be shut-off from the pressure accumulator and/or from the at least one high-pressure conduit during the filling and the refilling. In particular, this time can be utilized for pressure charging the pressure accumulator. The pressure charging of the pressure accumulator can take place at least so rapidly via at least one throttle, that the pressure accumulator is charged with pressure again before the next pressuring step, and at least so slowly that the amplitude of the pressure drop in the high-pressure conduit, said pressure drop being caused by the pressure charging, does not significantly compromise the cutting performance.

Optionally, energy can be stored in the pressure accumulator via a spring compression or fluid compression, during the pressure charging of the pressure accumulator.

Optionally, the filling, the pressurizing and the refilling can take their course in a cyclical manner whilst the cutting is carried out in a continuous manner.

Optionally, the pressure accumulator can be initially shut-off from the high-pressure conduit after the pressurizing of the lock chamber by way of pressure discharge of the pressure accumulator, wherein the pressure accumulator is not charged in pressure from the high-pressure conduit until the lock chamber has been pressurized at least partly from the high-pressure conduit via at least one throttle.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
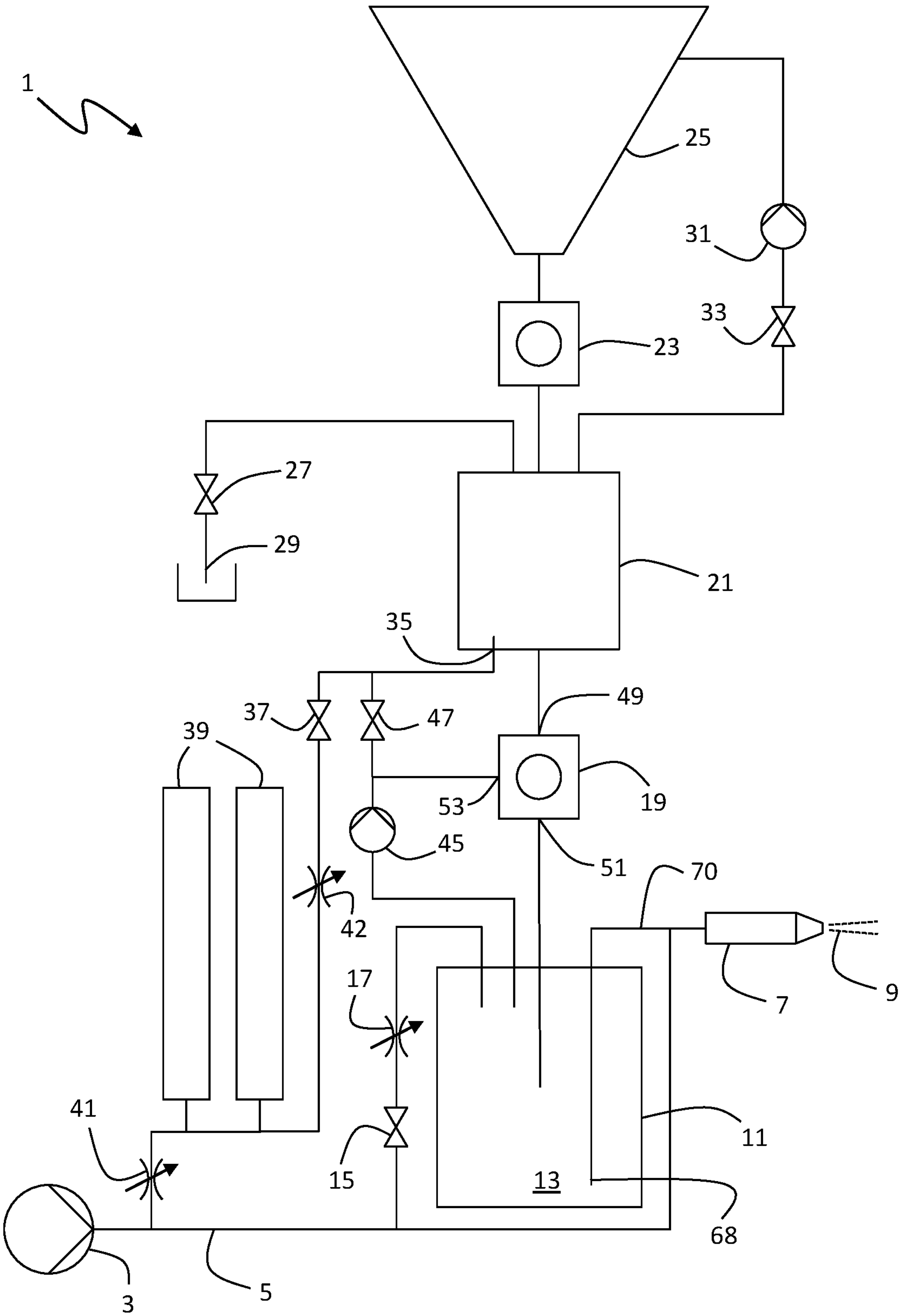
FIG. 1 is a schematic block diagram of a first embodiment example of the water-abrasive suspension cutting facility which is disclosed herein.

The water-abrasive suspension cutting facility 1 which is shown in FIG. 1 comprises a high-pressure source 3 which in a high-pressure conduit 5 provides water at a high pressure $p_0$ of about 1,500 to 4,000 bar. The high-pressure conduit 5 is connected to an exit nozzle 7, from which the water which is under a high pressure exits in a jet 9 at a very high speed. In order for the jet 9 to be able to be used effectively as a cutting jet for cutting material, the high-pressure conduit 5 is branched in a manner such that at least a part of the throughflow through the high-pressure conduit 5 is led through a pressure tank 11, in which a water-abrasive agent suspension 13 is located. The feeding of the water-abrasive agent suspension 13 to the exit nozzle can be switched on and off via a shut-off valve 15. The share of the water-abrasive agent suspension 13 in the jet 9 can be adjusted via a throttle 17, by way of the throughput quantity in the auxiliary line of the high-pressure conduit 5 which is led through the pressure tank 11 being throttled. The throttle

17 can be designed statically for example in the form of a hole plate or be adjustable or regulatable. The throttle 17 is preferably adjustable, so that the throttle 17 can shut off the feed flow into the pressure tank 11, possibly also in a complete manner, so that one can make do without the shut-off valve 15. The throttle 17 is preferably regulatable, wherein a signal which is characteristic of the abrasive agent removal flow and which can be obtained from a sensor or from an available operating parameter can be used as a control variable for the regulation of the opening of the throttle 17 (see FIG. 7*a-c*).

On cutting, water-abrasive agent suspension 13 is taken from the pressure tank 11 and water is fed to this at a high pressure, wherein the abrasive agent which is located in the pressure tank 11 is therefore consumed. The pressure tank 11 must therefore be continuously or sequentially refilled with abrasive agent. For this, a refilling valve 19 in the form of a ball cock is arranged above the pressure tank 11. The refilling valve 19 connects a lock chamber 21 which is arranged above the refilling valve 19, to the pressure tank 11. In turn, a filling valve 23 which connects a refilling funnel 25 which is arranged above the lock chamber 21 to the lock chamber 21 is arranged above the lock chamber 21. The filling valve 23 can be designed with essentially an identical construction as the refilling valve 19 in the form of a ball cock.

The refilling funnel 25 is not under pressure, so that dry, humid or wet abrasive agent or a water-abrasive agent suspension can be filled in from above (see FIGS. 8-12). This at least partly can be an abrasive agent which is recovered from the cutting jet 9 and which in a dry, wet, frozen, pelleted or suspended form can be filled from above into the refilling funnel 25 via a delivery device (see FIGS. 8-12). If the refilling valve 19 is closed, then the lock chamber 21 can be partly without pressure. For example, a pressure in the lock chamber 21 can be relieved into a discharge 29 via a pressure relief valve 27 in the form of a needle valve. The filling valve 23 can be opened given a pressureless lock chamber 21, so that abrasive agent falls from the refilling funnel 25 into the lock chamber 21. This filling of the lock chamber 21 with abrasive agent due to gravity can be assisted or accelerated by a pump 31. The pump 31 can be connected to the lock chamber 21 at the suction side and to the refilling funnel 25 at the delivery side. The pump 31 can herewith suck abrasive agent into the lock chamber 21. Above all, this makes particular sense if abrasive agent gets clogged in the tapered lower region of the refilling funnel 25 or at the filling valve 23. A clogging can be overcome or the occurrence of such can be prevented by way of sucking the abrasive agent downwards by way of the pump 31. So that the pump 31 does not need to be designed for high pressure, it is advantageous for the pump 31 to be able to be shut off from the lock chamber 21 by way of a pump shut-off valve 33 in the form of a needle valve. The pump shut-off valve 33 can herein be designed such that it can be purged, in order to purge the valve seat and the valve body, e.g. in the form of a valve needle, free of abrasive agent (see FIGS. 19*a-b*). By way of this, on the one hand a sealed closure of the pump shut-off valve 33 is ensured and on the other hand the material wear in the valve is reduced. The pump 31 can be protected from abrasive agent to a high degree by a filter and/or separator (both not shown) which are arranged upstream.

The pump shut-off valve 33 is only opened when the lock chamber 21 is already pressureless. For this reason, a first embodiment of the needle valve according to FIG. 19*a* can be used for the pump shut-off valve 33, concerning which a lateral purge inlet and a lateral purge outlet which lies opposite this are provided. In contrast, the second embodiment of the needle valve according to FIG. 19*b*, concerning which a check valve is provided on the purge inlet, is more advantageous for the pressure relief valve 27. Since the pressure relief valve 27 is opened at high pressure, the check valve prevents a pressure relief in the direction of the purge inlet. The purge outlet can run out into the discharge 29, so that the pressure relief as well as the purging agent discharge takes place exclusively towards the discharge 29 and not to the purge inlet.

The filling valve 23 can be closed as soon as the lock chamber 21 is then filled for example with 1 kg of abrasive agent. Furthermore, the pressure relief valve 27 and the pump shut-off valve 33 are now closed. The lock chamber 21 in a lower region comprises a pressurization entry 35, via which the lock chamber 21 can be pressurized. The pressurization entry 35 in the embodiment example of FIG. 1, in a manner capable of being shut off is connected to a pressure accumulator 39 via a pressurization valve 37 in the form of a needle valve and to the high-pressure conduit 5 via throttles 41 42. The pressure accumulator 39 comprises two pressure accumulator units in the form of spring accumulators which are connected in parallel to the entry of the pressurization valve 37. The pressure accumulator 39 is connected to the high-pressure conduit 5 via the throttle 41. The throttles 41, 42 can be designed in a static manner, for example in the form of hole plates, or in an adjustable or regulatable manner. If the throttles 41, 42 are adjustable to a certain degree, with regard to which the connection between the high-pressure conduit 5 and the pressurization entry 35 can be completely shut off, then one can possibly make do without the pressurization valve 37. The pressure accumulator 39 is completely charged in pressure before the lock chamber 21 is pressurized. As soon as the pressurization valve 37 is opened, the pressure accumulator 39 discharges pressure into the lock chamber 21 and hence rapidly subjects this to about 40% of the high pressure $p_0$ which is provided in the high-pressure conduit 5 as a nominal high pressure by the high-pressure source 3. A pressure impulse is introduced from below into the lock chamber 21 by way of this rapid part-pressurization, said pressure impulse loosening up the abrasive agent. This is advantageous for the later discharge of the abrasive agent into the pressure tank 11. Since the high-pressure conduit 5 is also connected to the lock chamber 21 via the throttle 41, a throttled, i.e. slower pressurization through the high-pressure conduit 5 takes place with the opening of the pressurization valve 37. As soon as the pressure accumulator 39 is discharged of pressure, the remaining required pressure in the lock chamber 21 is built up from about 60% of the nominal high pressure $p_0$ exclusively via the throttled, i.e. slower pressurization from the high-pressure conduit 5. The amplitude of the pressure drop in the high-pressure conduit 5 is limited to a minimum herewith.

In the first embodiment which is shown in FIG. 1, the pressure accumulator 39 is charged in pressure immediately from the moment, in which it has discharged itself of pressure. In this case, the high-pressure conduit 5 pressurizes the lock chamber 21 with the residual pressure as well as the pressure accumulator 39. This is particularly advantageous when the charging of the pressure accumulator 39 with pressure is so time-consuming that the refilling throughput rate depends on the pressure charging time of the pressure accumulator 39.

Figure 2:
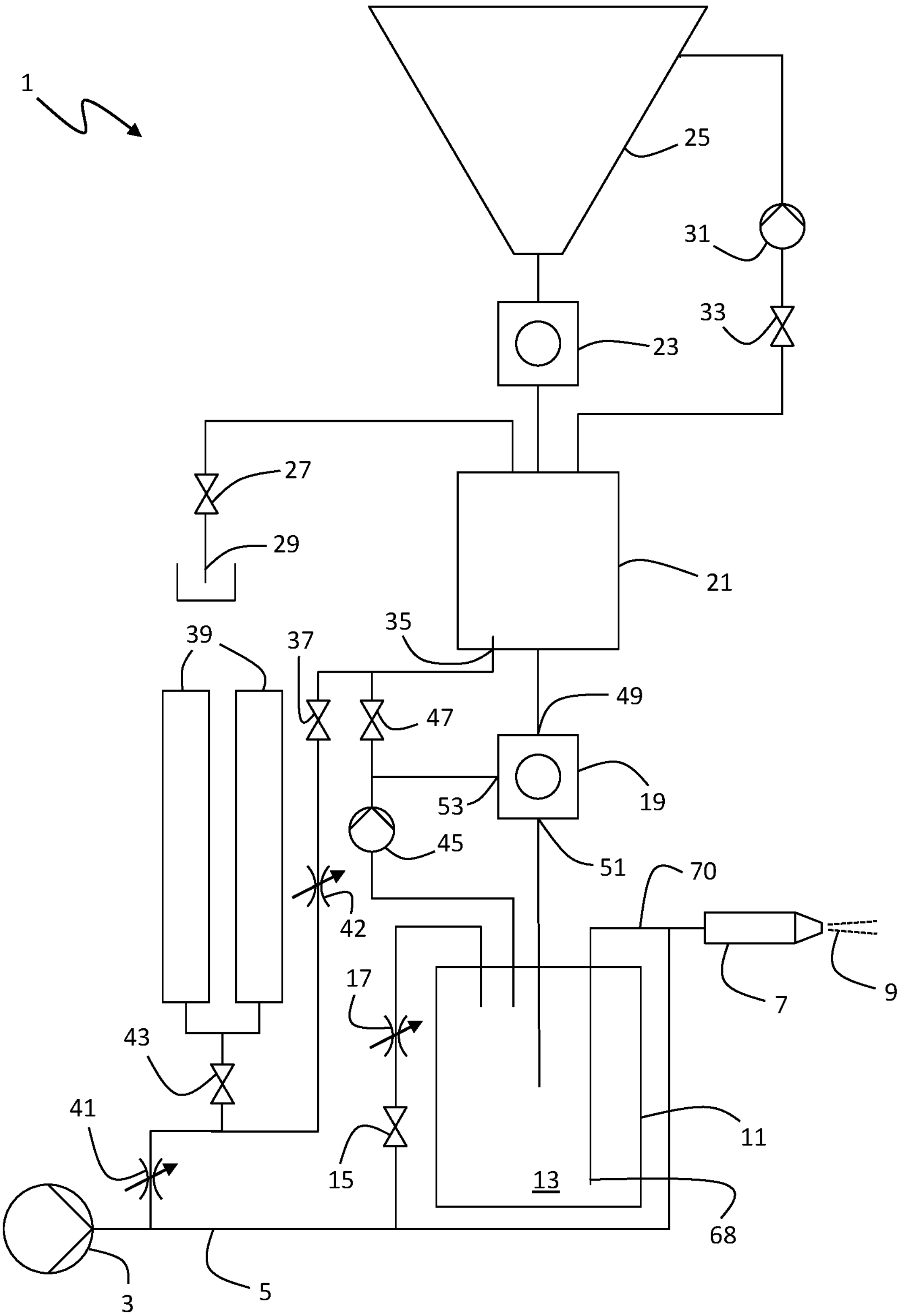
FIG. 2 is a schematic block diagram of a second embodiment example of the water-abrasive suspension cutting facility which is disclosed herein.

In the second embodiment which is shown in FIG. 2, the pressure accumulator 39 can be shut off by a pressure accumulator valve 43 in the form of a needle valve. The pressure accumulator valve 43 can be shut off at the moment, in which the pressure accumulator 39 has discharged itself of pressure, in order not to additionally load the high-pressure conduit 5 by the pressurization of the pressure accumulator 39 during the pressurization of the lock chamber 21. Such a loading could cause a pressure drop in the high-pressure conduit 5 which could have a negative influence upon the cutting performance at the exit nozzle 7. For this reason, it is advantageous for the pressure accumulator valve 43 not to open until the lock chamber 21 is completely pressurized and the pressurization valve 37 is closed, so that the pressure accumulator 39 can be charged in pressure from the high-pressure conduit 5 via the throttle 41. In particular, this is advantageous if the pressure charging of the pressure accumulator 39 is not so time-consuming that the refilling throughput rate depends on the pressure charging time of the pressure accumulator 39. The filling of the lock chamber 21 and the refilling of the pressure tank 11 can last at least longer than the pressure charging of the pressure accumulator 39. The throttle 41 can be set/adjusted such that the pressure charging of the pressure accumulator 39 takes its course as slowly as possible, but still rapidly enough so that the pressure accumulator 39 is completely charged in pressure before the next procedure, for pressurizing the lock chamber 21.

Figure 3:
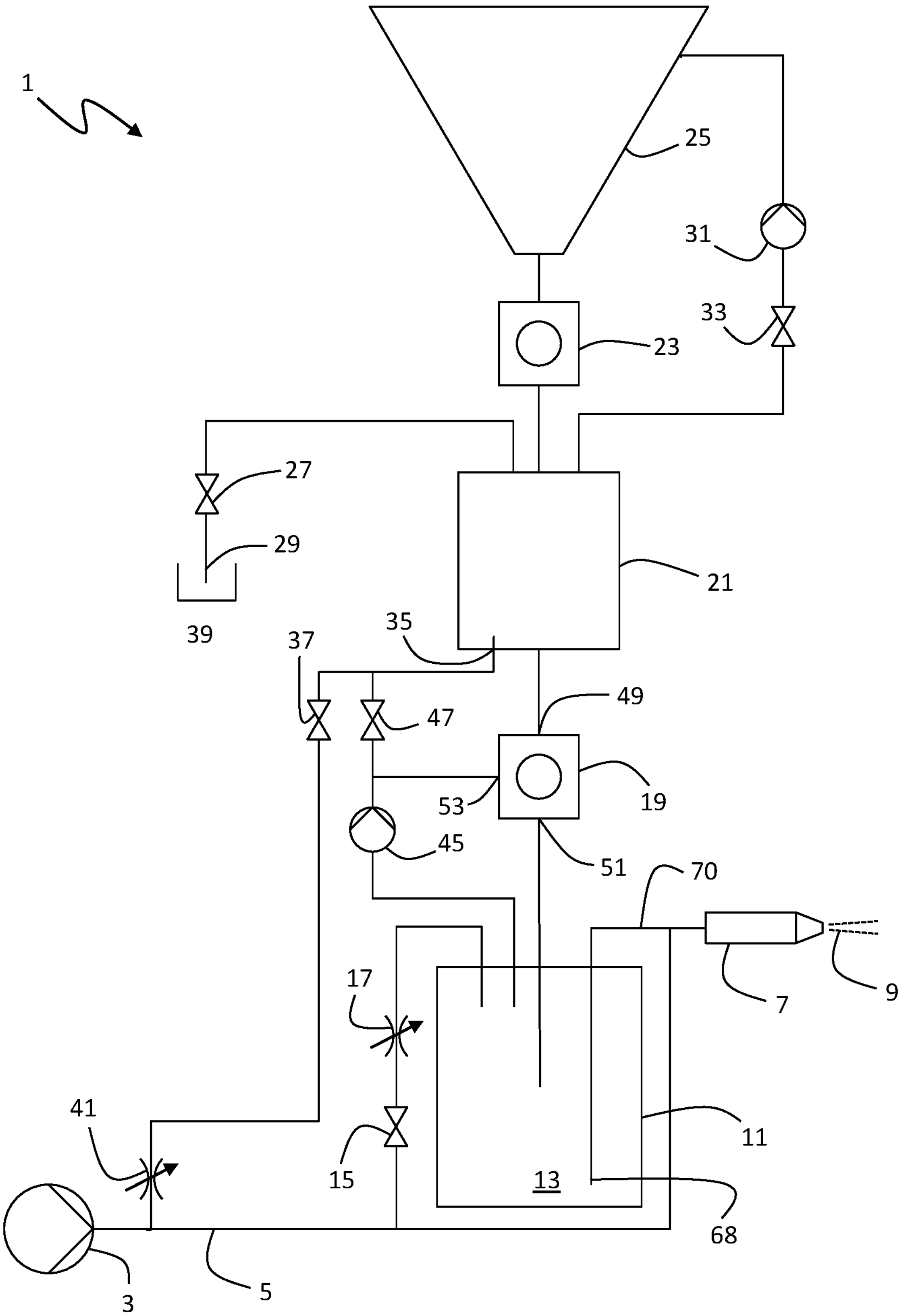
FIG. 3 is a schematic block diagram of a third embodiment example of the water-abrasive suspension cutting facility which is disclosed herein.

In a third embodiment according to FIG. 3, one completely forgoes the pressure accumulator 39, and the lock chamber 21 is pressurized exclusively from the high-pressure conduit 5 via the throttle 41. This is advantageous if the high-pressure source 3 for example via a servo pump control can react so quickly to an initial pressure drop and the pump power adapted accordingly, that a large amplitude of the pressure drop does not even occur in the first place. An initial pressure drop can be communicated to the high-pressure source 3 via pressure sensors, so that the high-pressure source 3 can rapidly counter-control a further pressure drop with an increase in the power or a speed increase. The initial pressure drop can already be lessened via the throttle 41, so that at no point in time does a pressure drop which significantly compromises the cutting power occur.

As soon as the lock chamber 21 has now been completely pressurized, the refilling valve 19 can be opened, so that abrasive agent can flow out of the lock chamber 21 through the refilling valve 19 into the pressure tank 11 due to gravity or assisted by gravity, in order to refill this pressure tank. A delivery aid 45, for example in the form of a pump is preferably provided, said delivery aid at the suction side being connected to the pressure tank 11 and at the delivery side to the lock chamber 21. The delivery aid 45 assists or produces the abrasive agent flow from the lock chamber 21 downwards into the pressure tank 11. It can prevent or release clogging of abrasive agent and accelerate the refilling procedure which is caused or assisted by gravity. In contrast to the pump 31 on the refilling funnel 25, the delivery aid 45 on the pressure tank 11 operates with water at the nominal high pressure $p_0$. For this reason, it must be designed for high-pressure operation. For example, as is shown in FIG. 6*b*, it can merely comprise an inductively driven impeller in high-pressure, so that the number of moving parts which are subjected to a high pressure is minimized. A delivery aid shut-off valve 47 is arranged between the delivery aid 45 and the lock chamber 21, wherein the delivery aid shut-off valve 47 in the form of a needle valve can shut off the pump 47 with respect to the lock chamber 21 when the lock chamber 21 is not or not completely pressurized. The delivery aid shut-off valve 47 is preferably a purgable needle valve according to FIG. 19*b* with a check valve at the purge inlet, since it is actuated at a high pressure.

Figure 6A:
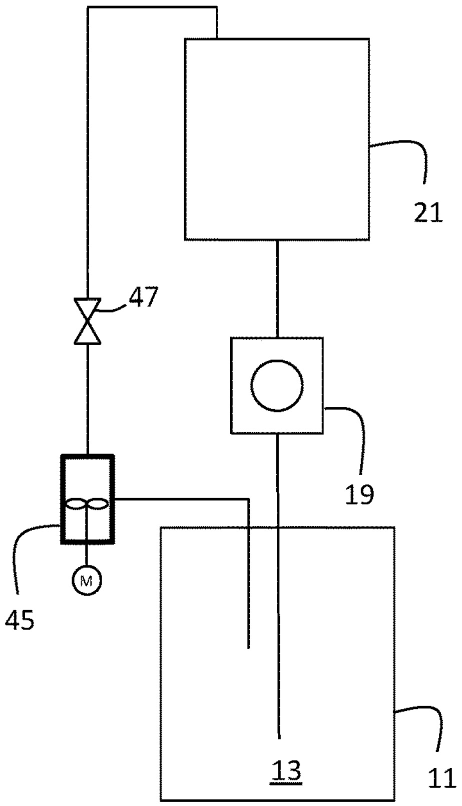
FIG. 6*a* is a schematic part block diagram of a first embodiment of a delivery aid of the water-abrasive suspension cutting facility which is disclosed herein.
Figure 6B:
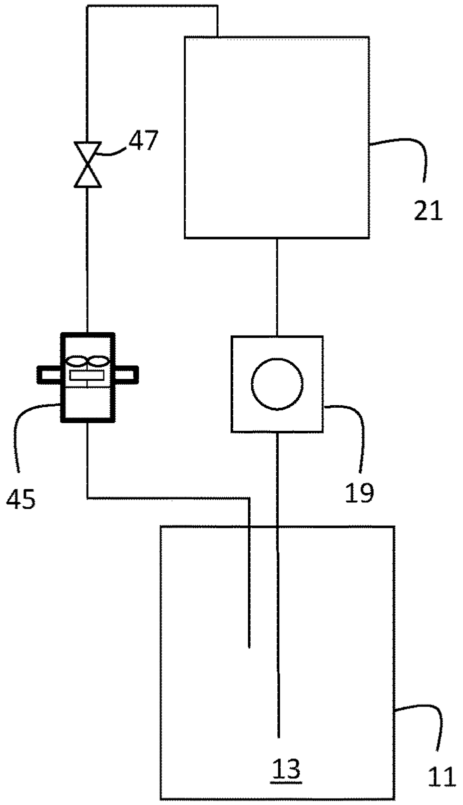
FIG. 6*b* is a schematic part block diagram of a second embodiment of a delivery aid of the water-abrasive suspension cutting facility which is disclosed herein.
Figure 6C:
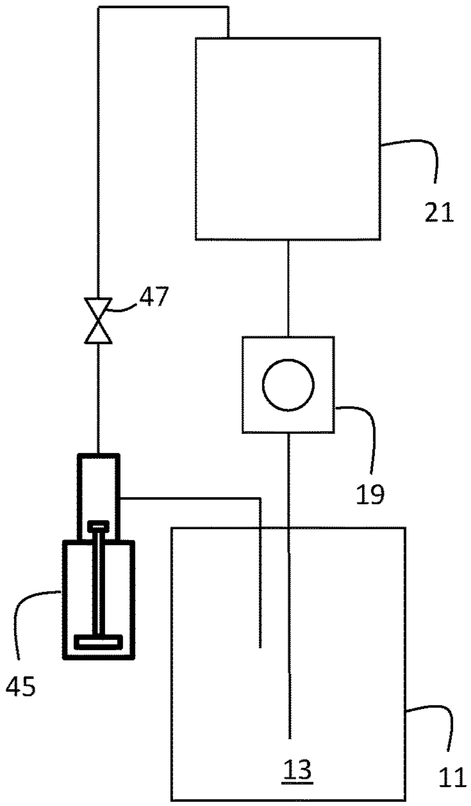
FIG. 6*c* is a schematic part block diagram of a third embodiment of a delivery aid of the water-abrasive suspension cutting facility which is disclosed herein.

FIG. 6*a*-*c* show different alternative embodiments for the delivery aid 45. The delivery aid 45 for example can comprise an impeller which is externally driven by a shaft (see FIG. 6*a*) or an inductively driven impeller (see FIG. 6*b*). The delivery aid 45 can also assist in the refilling of abrasive agent into the pressure tank 11 via a piston stroke (see FIG. 6*c*). The delivery aid 45 can pump or deliver in a continuous manner or in a temporally limited or pulsed manner. Possibly, it can be sufficient for the abrasive agent flow into the pressure tank 11 to only initially be assisted and for it to then continue in a sufficiently rapid manner solely in a gravity-assisted manner. Alternatively or additionally, the abrasive agent flow into the pressure tank 11 can be assisted or produced in a continuous manner.

Apart from an upper entry 49 and a lower valve exit 51, the refilling valve 19 can also comprise a lateral pressure inlet 53. A valve space, in which a movable valve body is located, can be subjected to pressure via the pressure inlet 53. Specifically, in the absence of pressurization of the valve space, it can be the case that the very high pressures upon the valve entry 49 and the valve exit 51 on starting operation of the facility press the valve body so greatly into the valve seat that the valve body can no longer be moved. A pressure compensation in the refilling valve 19 can be created via the lateral pressure inlet 53, so that the valve body is movable after starting operation.

Figure 4:
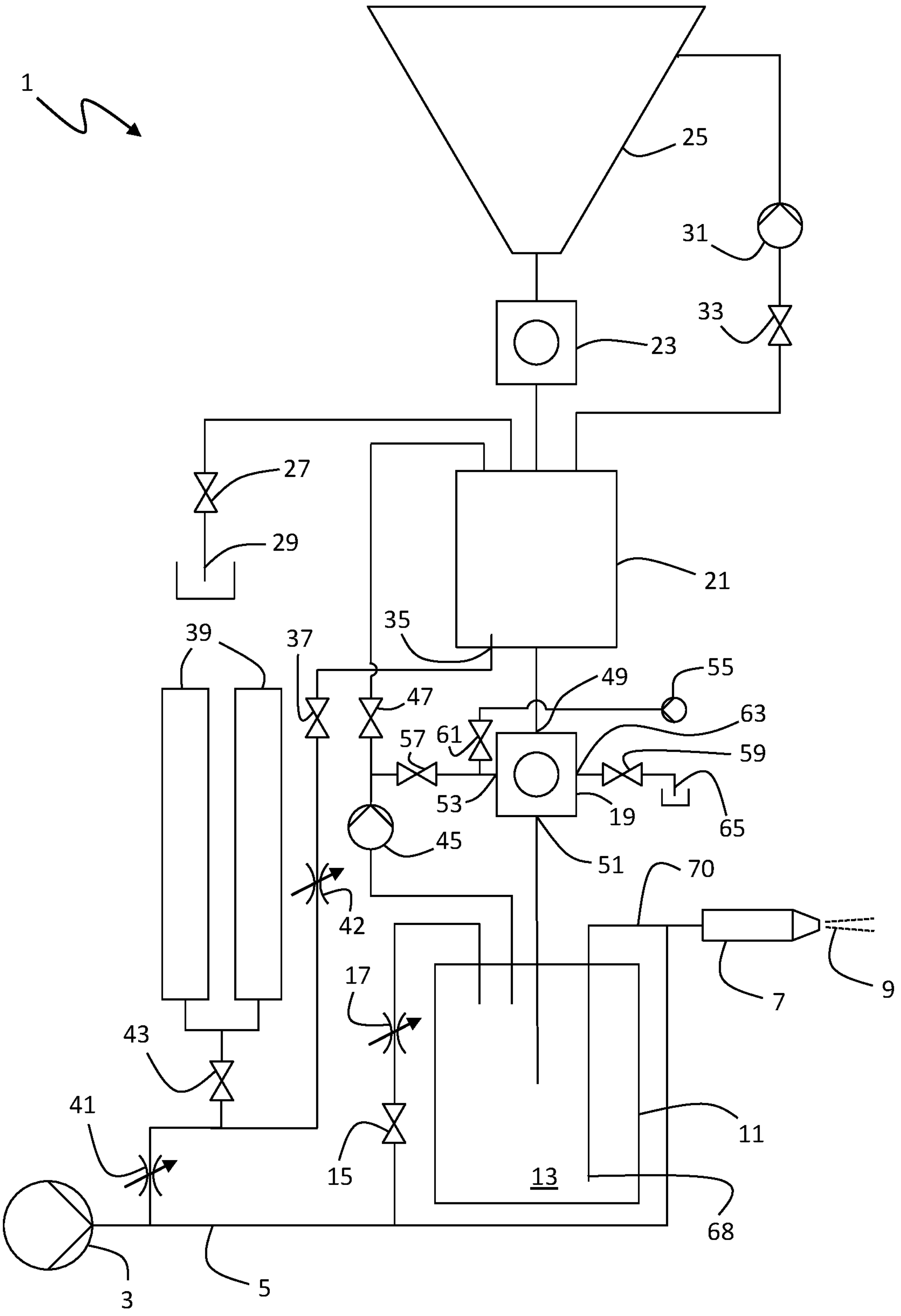
FIG. 4 is a schematic block diagram of a fourth embodiment example of the water-abrasive suspension cutting facility which is disclosed herein.
Figure 5:
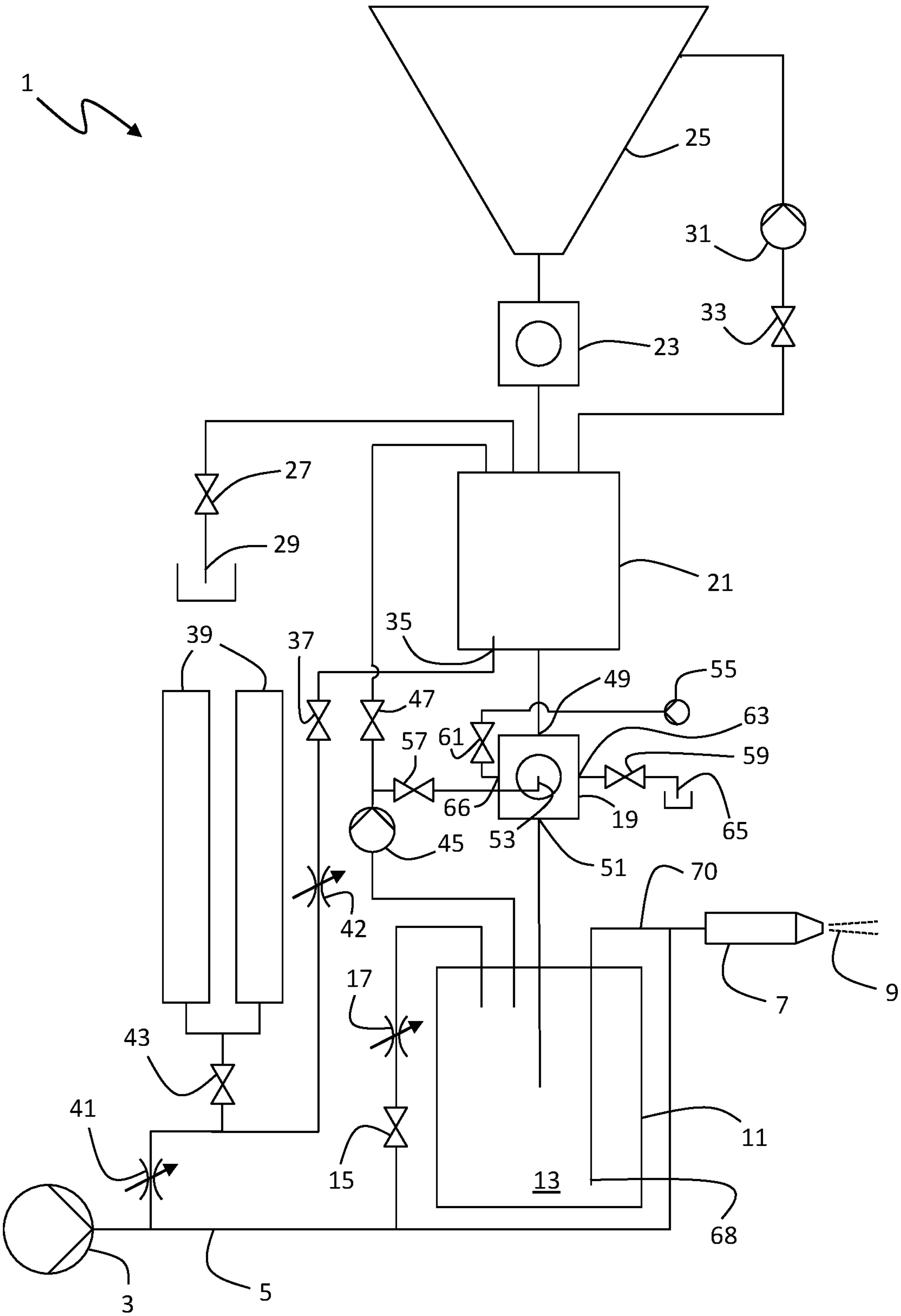
FIG. 5 is a schematic block diagram of a fifth embodiment example of the water-abrasive suspension cutting facility which is disclosed herein.

A purging (flushing) for the refilling valve 19 is provided in the fourth or fifth embodiment example which is shown in FIGS. 4 and 5. For this, a purging source 55 can be connected to the pressure inlet 53 in a manner capable of being shut off (see FIG. 4). Preferably, three purge valves 57, 59, 61 (flushing valves) which can switch the purging on and off which is to say separate it from the high pressure, are provided for this. A first purge valve 57 in the form of a needle valve is arranged between the delivery aid 45 and the pressure inlet 53. A second purge valve 59, here also denoted as a purge outlet valve 59, in the form of a needle valve is arranged between a lateral purge outlet 63 and a discharge 65. A third purge valve 61 in the form of a needle valve is arranged between the purging source 55 and the pressure inlet 53.

The refilling valve 19 is preferably closed in order to now purge the refilling valve 19 with water or a water-purging agent mixture, in order to be able to free a valve space of the refilling valve 19 from the abrasive agent residue. The first purge valve 57 is likewise closed so that pressure can be relieved from the pressure inlet 53 without relieving the pressure at the delivery aid 45. The second purge valve 59 is opened towards the discharge 65, so that the possibly existing high pressure can be relieved from the valve space. If now the third purge valve 61 is opened, then water or a water-purging agent mixture flows through the valve space to the discharge 65 and hence purges (rinses) this free of abrasive agent residues. The purging of the refilling valve 19 given a completely pressureless facility 1, in order to be able to completely flush out the valve space and herein to possibly be able to move the valve body, is preferably carried out as a service procedure.

As an alternative to the fourth embodiment according to FIG. 4, in a fifth embodiment according to FIG. 5 a purge inlet 66 can be provided separately from the pressure inlet 53 (see also FIGS. 15*a*-*b* and 17*a*-*b*). The pressure inlet 53 can be arranged coaxially to a servomotor shaft 86 and be arranged opposite this, wherein the purge inlet 66 and the purge outlet 63 transversely to the servomotor shaft 86 can be arranged coaxially to one another and each at opposite sides.

The purging is completed again by way of closing the three purge valves 57, 59, 61 in the reverse sequence, i.e. the third purge valve 61 is firstly closed, so that the purging flow is stopped. The second purge valve 59 is then closed, in order to close off the valve space with respect to the discharge 65. Finally, the first purge valve 57 can be opened so that the valve space is subjected to high pressure. The pressurizing of the valve space is advantageous since a valve body in the refilling valve 19 can be pressed so greatly into a valve seat by way of the high pressure difference between the valve exit 51 or the valve entry 49 and the valve space, that this valve body can no longer be moved. In contrast, the pressurizing of the valve space creates a pressure equalization, so that the valve body in the refilling valve 19 remains movable.

Figure 7A:
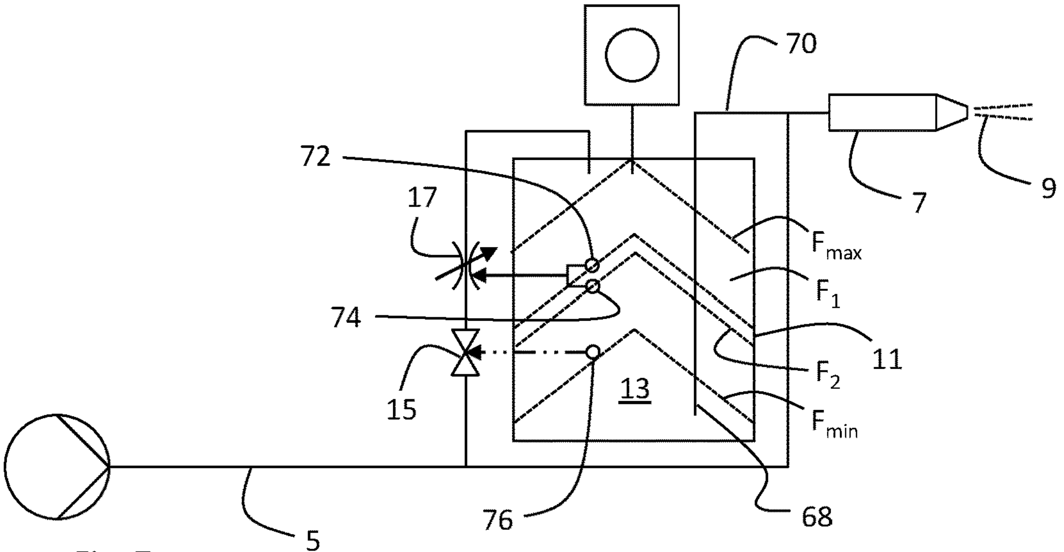
FIG. 7*a* is a schematic part block diagram of a first embodiment of an abrasive agent flow control of the water-abrasive suspension cutting facility which is disclosed herein.
Figure 7B:
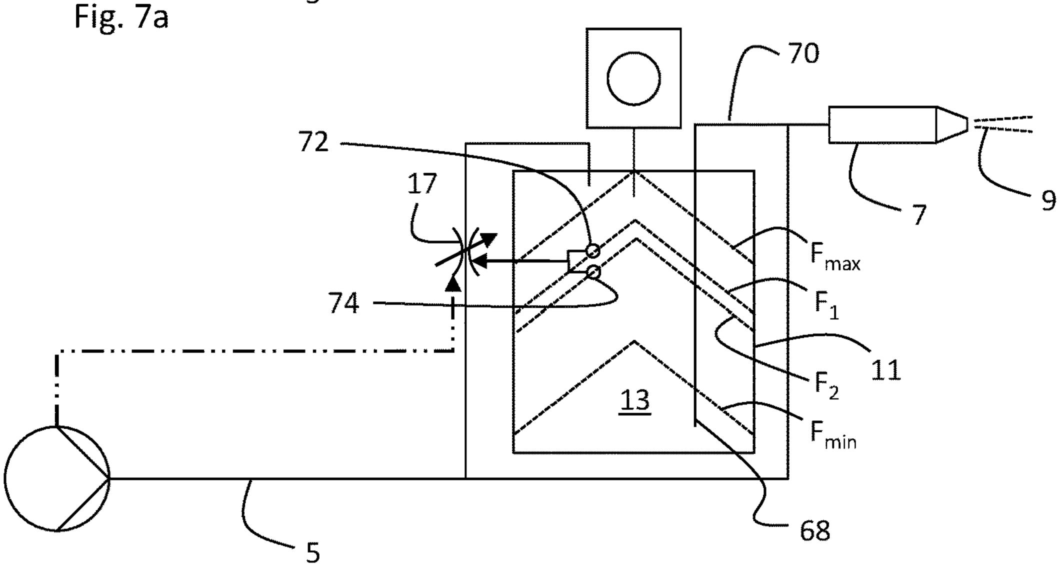
FIG. 7*b* is a schematic part block diagram of a second embodiment of an abrasive agent flow control of the water-abrasive suspension cutting facility which is disclosed herein.
Figure 7C:
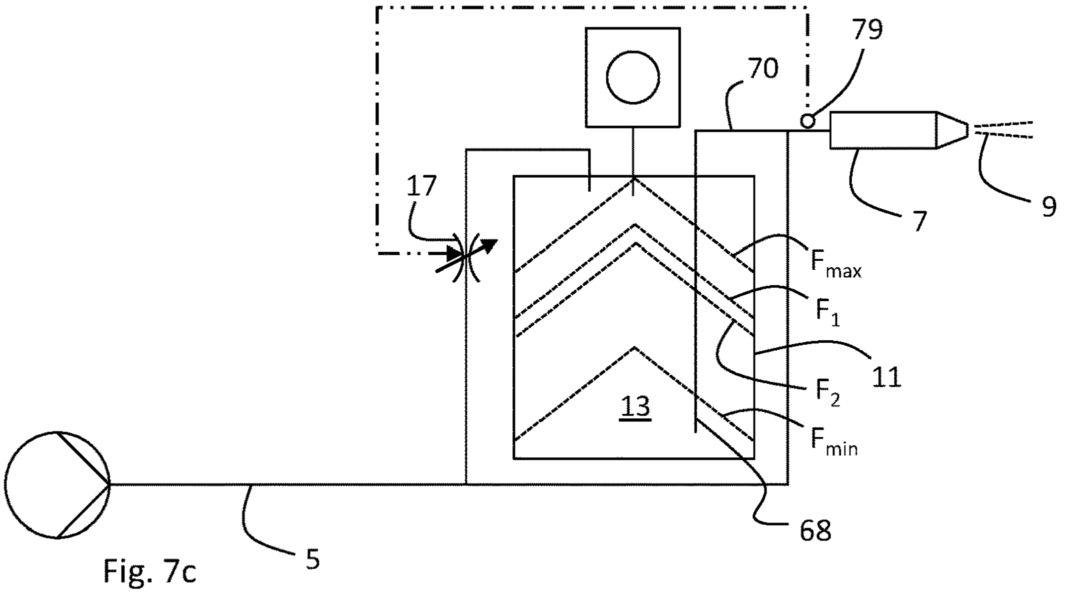
FIG. 7*c* is a schematic part block diagram of a third embodiment of an abrasive agent flow control of the water-abrasive suspension cutting facility which is disclosed herein.
Figure 8:
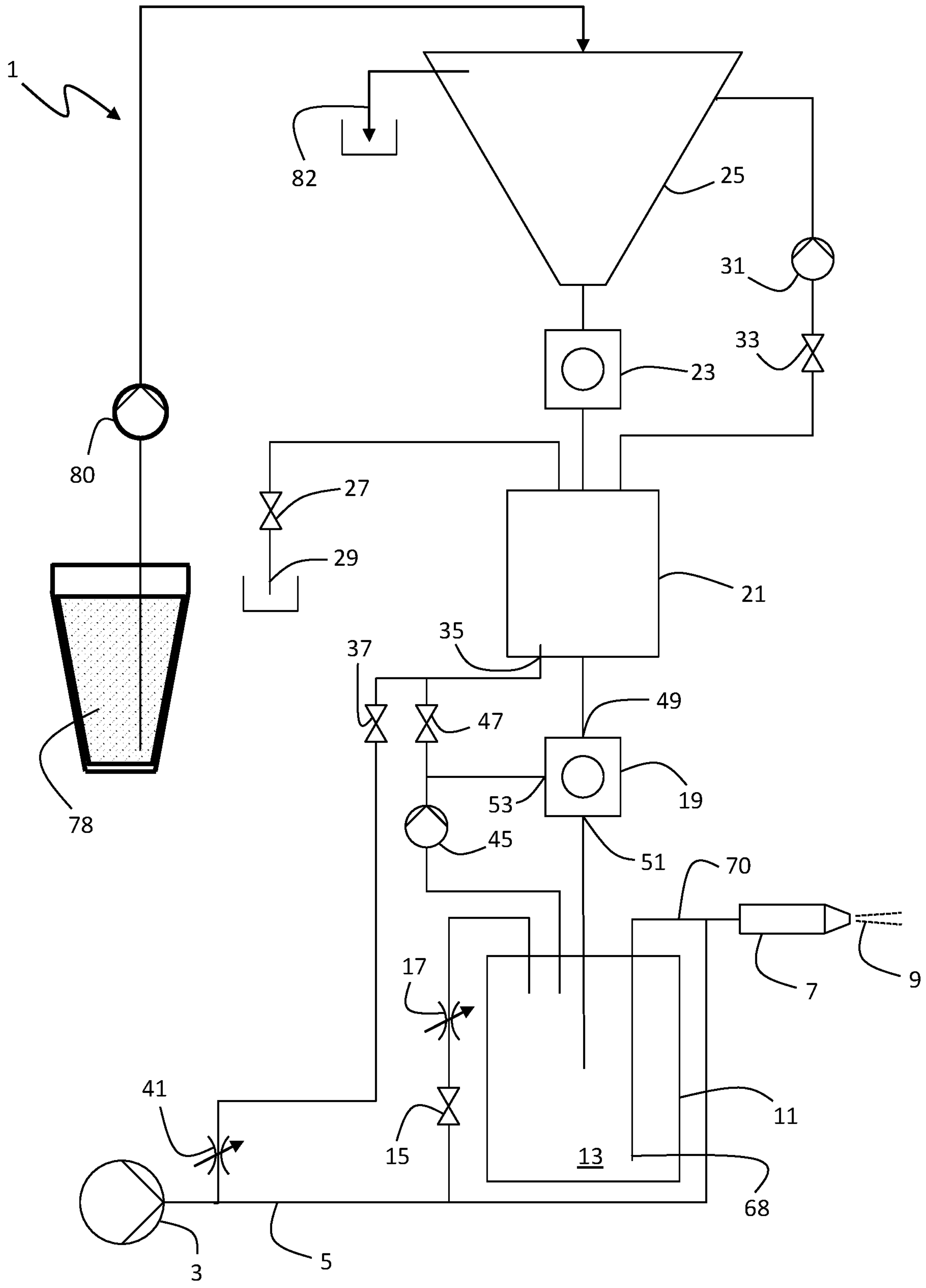
FIG. 8 is a schematic block diagram of a first embodiment of an abrasive agent refilling device of the water-abrasive suspension cutting facility which is disclosed herein.

A preferred regulation (closed-loop control) of the abrasive agent removal flow is illustrated in the part block diagrams according to FIG. 7*a*-*c*. A branching of the high-pressure conduit 5 is led through the pressure tank 11 which is filled with abrasive agent suspension 13, for admixing abrasive agent into the cutting jet 9. A removal location 68 which is arranged in the lower region of the pressure tank 11 is connected to the exit nozzle 7 via an abrasive agent conduit 70, and a branching of the high-pressure conduit 5 is led via a regulation valve or regulatable throttle 17 into an upper region of the pressure tank 11. The abrasive agent conduit upstream of the exit nozzle 7 is brought together again with the high-pressure conduit 5 downstream of the pressure tank 11, so that the cutting jet for example comprises a mixing ratio of 1:9 of abrasive agent suspension to water. Herein, the mixing ratio can be regulated (closed-loop controlled) via the throttle or regulation valve 17, which is connected to the pressure tank 11 at the entry side. Given a maximal open position of the regulation valve 17, the abrasive agent removal flow is maximal and the mixing ratio is maximal. Given a minimal open position or closure position (see FIG. 7*b* or 7*c*) of the regulation valve 17, the abrasive agent removal flow is minimal or zero and the mixing ratio is accordingly low or the cutting jet 9 then comprises exclusively water.

Now, for various reasons, it is advantageous to measure and regulate the actual abrasive agent removal flow. On the one hand, a certain mixing ratio can be optimal for the cutting of certain materials, workpieces or workpiece sections, concerning which only as much abrasive agent as is necessary for achieving the cutting performance is removed. Concerning inhomogeneous workpieces, the cutting power can be adapted during the cutting via the mixing ratio. On the other hand, the refilling of the pressure tank 11 with abrasive agent in accordance with the abrasive agent removal flow can be controlled such that sufficient abrasive agent suspension 13 is constantly present in the pressure tank 11 for a continuous cutting. In FIG. 7*a*-*c*, four different filling levels of the abrasive agent in the pressure tank 11 are indicated by dashed cones. Two further filling level cones $F_1$ and $F_2$ are shown between a maximal filling level cone $F_{max}$ and a minimal filling level cone $F_{min}$, wherein $F_{max}>F_1>F_2>F_{min}$. Here, it is once again pointed out that the complete facility 1 and in particular the pressure tank 11 are completely free of air. This means that the filling level cones are located in water subjected to high pressure. The maximal filling level cone $F_{max}$ is defined in that a backlog into the refilling valve 19 would result given a further refilling with abrasive agent into the pressure tank 11. The minimal filling level cone $F_{min}$ is defined in that given a further abrasive agent removal, the abrasive agent share of the abrasive agent suspension in the exit-side abrasive agent conduit 70 would reduce.

As is shown in FIGS. 7*a* and 7*b*, filling level sensors 72, 74, 76 can be arranged on the pressure tank 11, in order to signalize the reaching of the filling level cone. The filling level sensors 72, 74, 76 can be for example ultrasound sensors, optical sensors or light barriers, electromagnetic sensors or sensors of another type. Here, the filling level sensors 72, 74, 76 are ultrasound sensors which can signalize a reaching of a filling level cone via a change of the structure-borne sound. An upper filling level sensor 72 for example can signalize the reaching of the filling level cone $F_1$ and start a timer or define a point in time $t_1$. A lower filling level sensor 74 can for example signalize the reaching of the filling level cone $F_2$ and stop a timer after $\Delta t$ or define a point in time $t_2$. An average abrasive agent removal flow can be determined via the known geometry of the pressure tank 11 and the vertical distance of the filling level sensors 72, 74, as $\Delta V/\Delta t$ or $\Delta V(t_2-t_1)$. The third lowermost filling level sensor 76 can signalize the minimal filling level cone $F_{min}$ and immediately effect a shut-off of the shut-off valve 15 in order to prevent the pressure tank 11 from being sucked empty. According to FIG. 7*b*, other operating parameters such as for instance the pump speed of the high-pressure source 3 can be used for determining the abrasive agent removal flow and its regulation as a control variable for the regulation valve 17. As is shown in FIG. 7*c*, the abrasive agent throughput or the mixing ratio can be determined by way of a suitable sensor 79 also at the abrasive agent conduit 70 or upstream of the exit nozzle 7 and be used as a control variable for the regulation valve 17.

The filling level sensors 72, 74 can also be used to control or cycle the refilling cycles. For example, above the upper filling level sensor 72 a filling of the lock chamber 21 can fit between the filling level cone $F_1$ and the maximal filling level cone $F_{max}$. If the fluid level cone drops below $F_1$, then the upper filling level sensor 72 can activate a filling of the lock chamber 21 so that this is completely filled when the lower filling level sensor 74 signalizes the filling level cone $F_2$ and can herewith activate a refilling from the filled lock chamber 21 into the pressure tank 11. Herewith, one prevents the filling level cone from dropping to the minimal filling level cone $F_{min}$. At least a filling of the lock chamber 21 as a buffer can fit between the minimal filling level cone $F_{min}$ and the filling level cone $F_2$. As an alternative to an activating of the filling of the lock chamber 21 given a certain filling level, the lock chamber 21 can be automatically immediately filled again as soon as the refilling of the pressure tank 11 is completed. The refilling from the lock chamber 21 then only needs to be actuated at the filling level cone $F_2$. The vertical distance between the upper filling level sensor 72 and the lower filling level sensor 74 can be selected relative short, for example so short that a dropping between $F_1$ and $F_2$ lasts for a shorter period of time than a filling procedure of the lock chamber 21. Given a shorter vertical distance, the average abrasive agent removal flow $\Delta V/\Delta t$ or $\Delta V(t_2-t_1)$ can be determined more frequently and herewith can more accurately represent the current abrasive agent removal flow dV/dt.

FIGS. 8 to 12 show different possibilities of bringing abrasive agent in a dry, wet, moist, suspended, frozen, pelleted or another form, into the refilling funnel 25 or directly into the filling valve 23. A preloading container 78, from which abrasive agent suspension is delivered into the refilling funnel 25 by way of a pump 80 is provided in FIG.

8. On loading the refilling funnel 25, water which is displaced by the sinking abrasive agent can run off via an overflow 82 on the refilling funnel.

Figure 9:
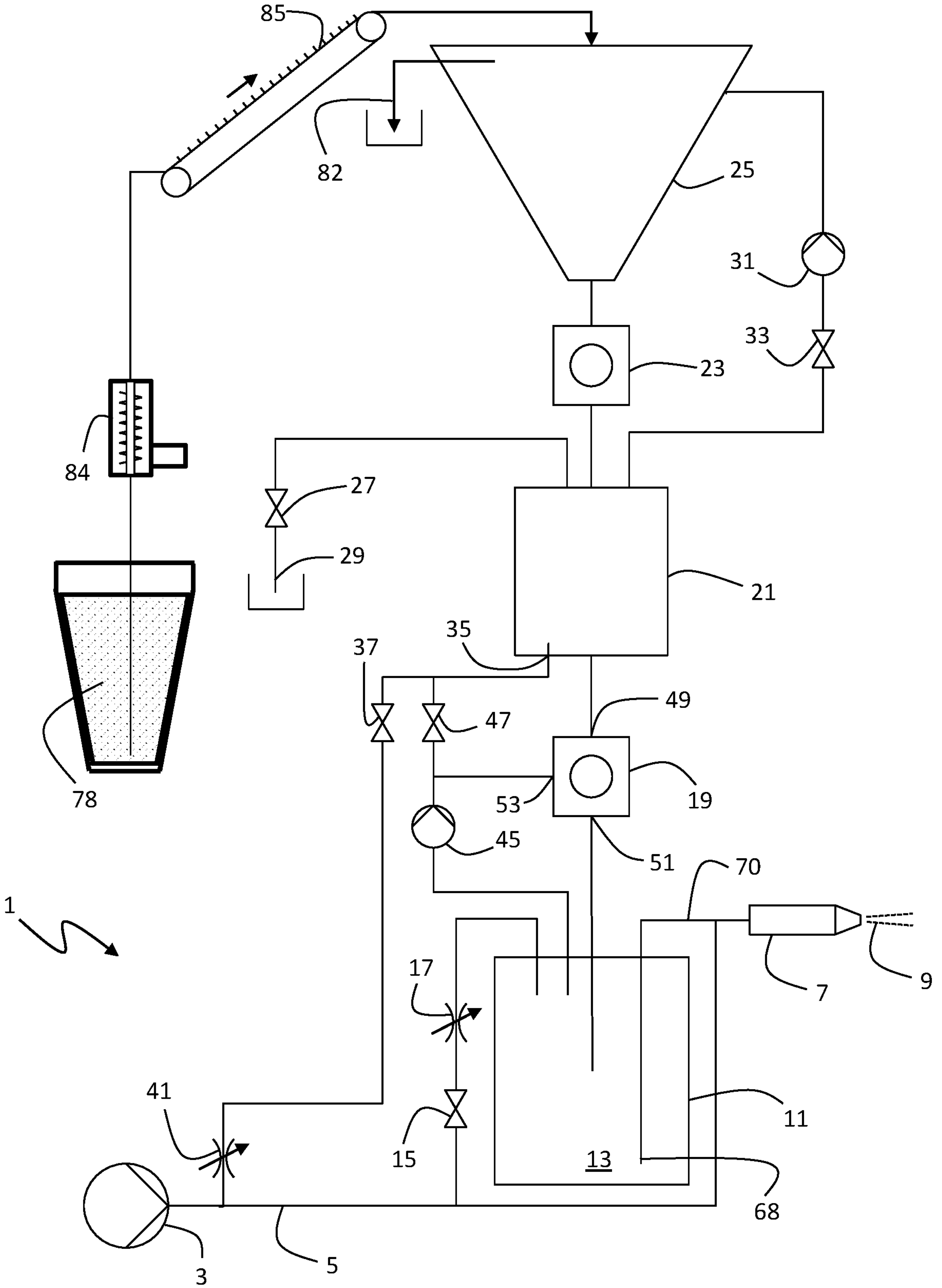
FIG. 9 is a schematic block diagram of a second embodiment of an abrasive agent refilling device of the water-abrasive suspension cutting facility which is disclosed herein.

A preloading container 78, from which dry, powder-like or moist lumpy abrasive agent is delivered into the refilling funnel 25 by way of a delivery screw 84 and/or a conveyor belt 85 is provided in FIG. 9. Here too, on loading the refilling funnel 25, water which is displaced by the sinking abrasive agent can run off via the overflow 82 on the refilling funnel 25. The abrasive agent can be recovered and processed from the waste water of the cutting jet 9 after a cutting process for example, so that it can be utilized for a further cutting process. The advantage of this facility compared to known water-abrasive suspension cutting facilities is that such a reprocessed abrasive agent does not need to be dried and can be filled into the facility in a moist-lumpy or arbitrary form.

Figure 10:
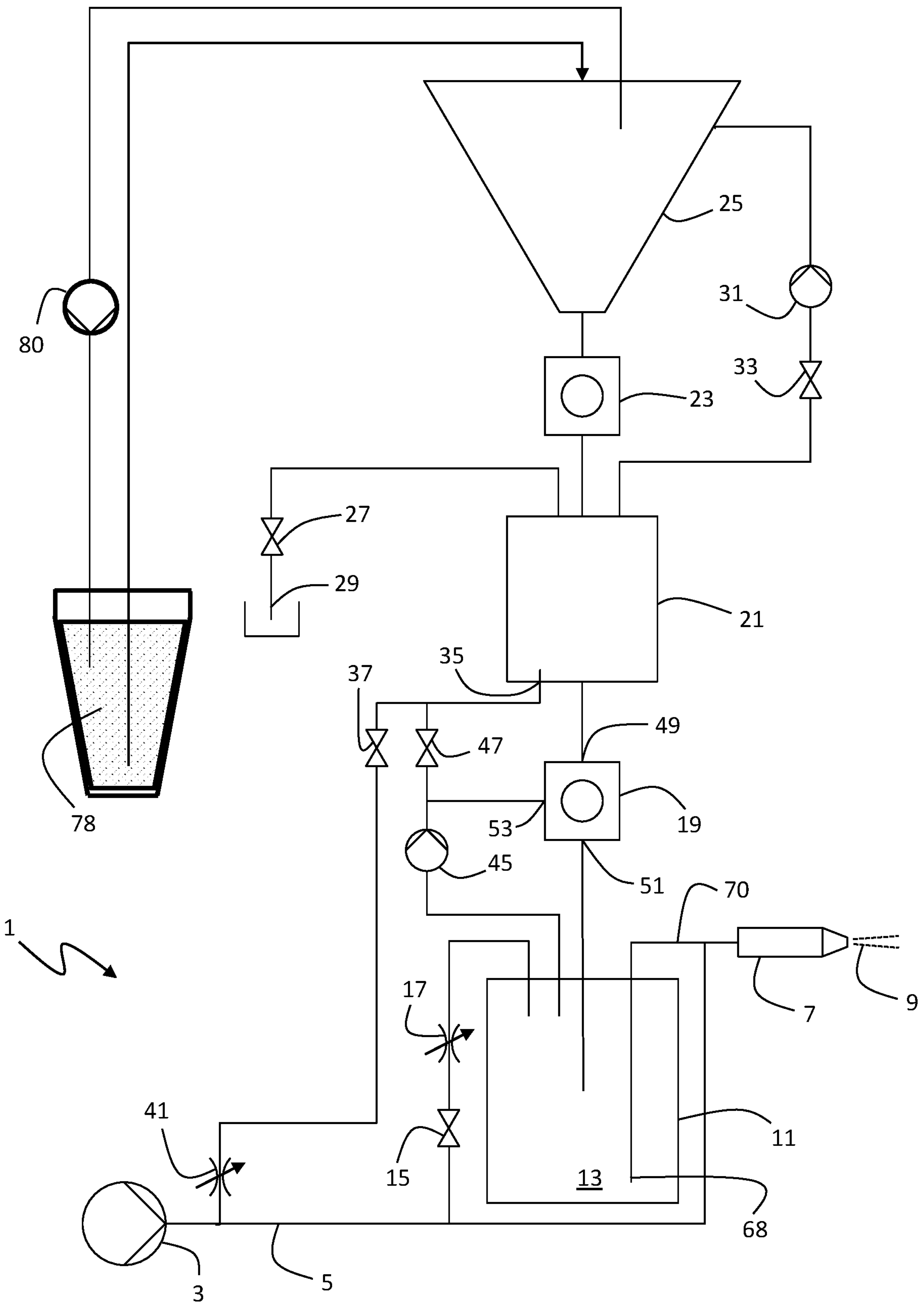
FIG. 10 is a schematic block diagram of a third embodiment of an abrasive agent refilling device of the water-abrasive suspension cutting facility which is disclosed herein.
Figure 11:
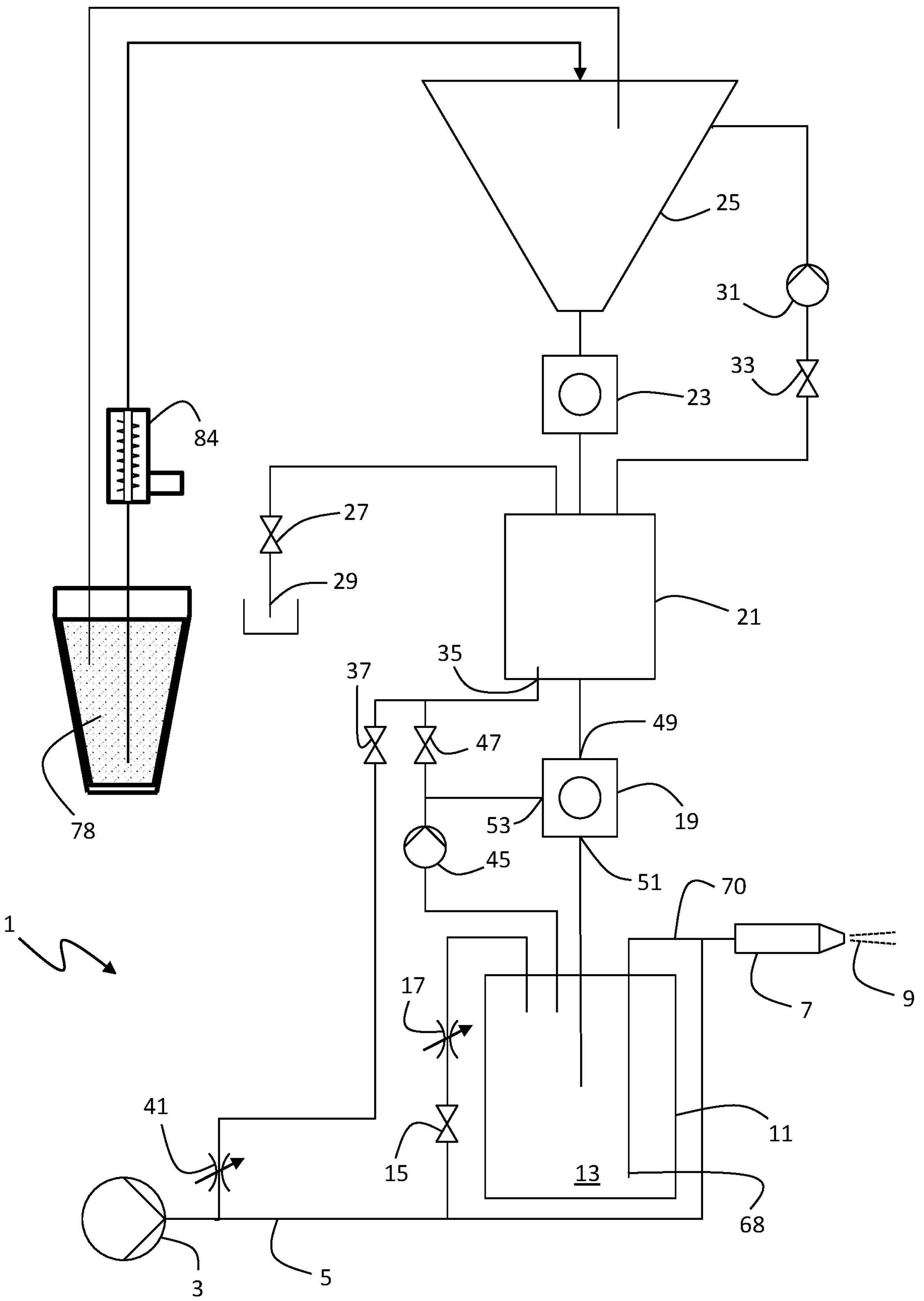
FIG. 11 is a schematic block diagram of a fourth embodiment of an abrasive agent refilling device of the water-abrasive suspension cutting facility which is disclosed herein.
Figure 12:
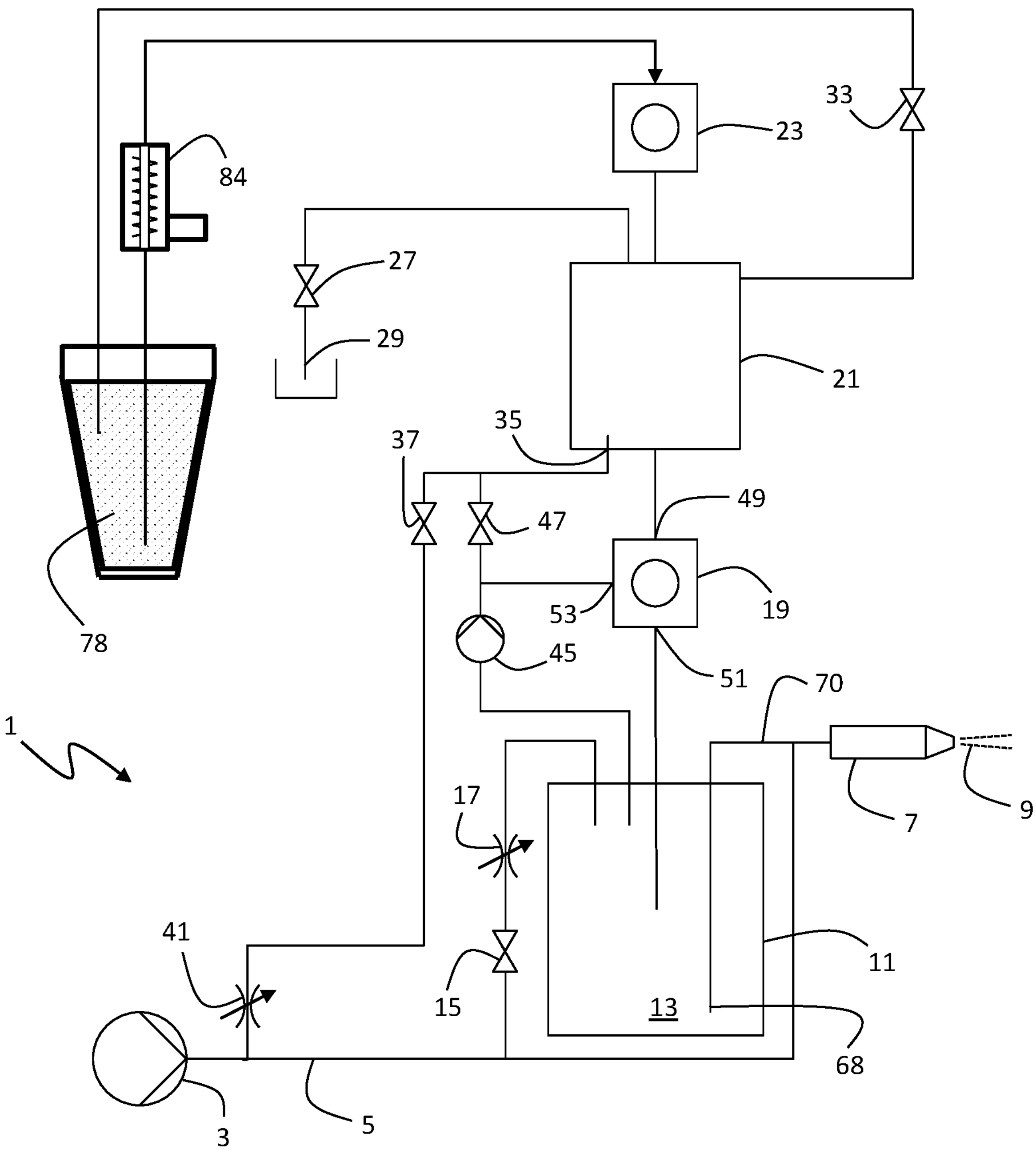
FIG. 12 is a schematic block diagram of a fifth embodiment of an abrasive agent refilling device of the water-abrasive suspension cutting facility which is disclosed herein.

No overflow 82 is provided in FIG. 10, but a circulation between the refilling funnel 25 and the preloading container 78, wherein the pump 80 at the exit side of the refilling funnel 25 drives the circulation for filling the refilling funnel 25 with abrasive agent. In this case, the refilling funnel 25 is preferably closed, so that the pump 80 can suck abrasive agent suspension out of the preloading container 78. Thereby, it is advantageous for the pump 80 to deliver relatively clean water and no saturated abrasive agent suspension as in FIG. 8. The wearing in the pump 80 is reduced by way of this. Furthermore, a sucking of the abrasive agent suspension is less prone to clogging than a pressurizing. As is shown in FIG. 11, a delivery screw 84 can however also be arranged at the entry side to the refilling funnel 25 in order to deliver abrasive agent into the refilling funnel 25. In particular, this is advantageous if no abrasive agent suspension is in the preloading container 78, but abrasive agent as a dry powder or in moist-lumpy form.

One can even completely forgo the refilling funnel 25 (see FIG. 12) if the delivery via a conveying screw 84 or a pump 80 takes place rapidly enough and directly into the filling valve 23 in a controlled manner. The water which is displaced by the abrasive agent on filling the lock chamber 21 can be led out of the lock chamber 21 back into the refilling funnel 25 via the pump shut-off valve 33. This can also be assisted by a pump 31 according to FIGS. 1 to 5, in order to additionally actively suck abrasive agent into the lock chamber 21.

Figure 13:
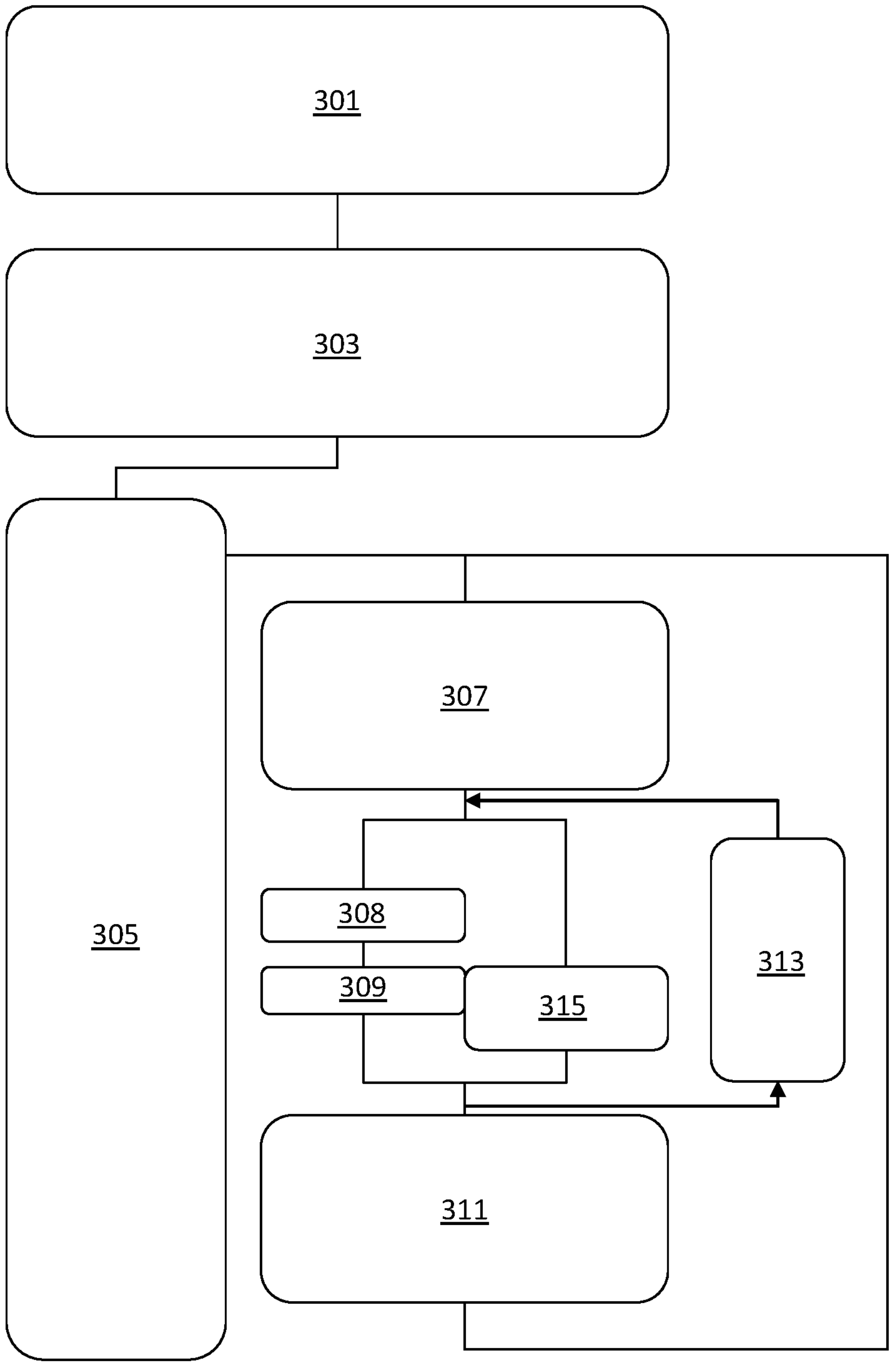
FIG. 13 is a schematic sequence diagram of an embodiment example of the method which is disclosed herein, for water-abrasive suspension cutting.

The refilling of the abrasive agent into the pressure tank 11 according to an embodiment example of the method which is disclosed herein, for water-abrasive suspension cutting, is effected in a portioned and cyclical manner, during which a workpiece which is to be machined can be continuously cut with the cutting jet 9. FIG. 13 illustrates the method steps in the temporal course. In a first step 301, water is provided at a high pressure in the high-pressure conduit 5 by way of the high-pressure source 3. Herewith, an abrasive agent suspension which is also under pressure is also provided 303 in the pressure tank 11. Herewith, a workpiece can already be cut 305 by way of the high-pressure jet 9 which at least partly comprises the abrasive agent suspension, whilst removing the abrasive agent suspension from the pressure tank 11. The steps 307 to 311 serve for the portioned and cyclical refilling of the pressure tank 11 with abrasive agent during the continuous cutting 305. The non-pressurized lock chamber 21 is firstly filled 307 with abrasive agent or with an abrasive agent suspension. During the filling, the delivery aid 45 is shut-off from the non-pressurized lock chamber 21 by way of the delivery aid shut-off valve 47. The pump 31 is then shut off 308 from the lock chamber 21. The lock chamber is subsequently at least partly pressurized 309 by way of pressure discharge of the pressure accumulator 39, and finally the pressure tank 11 is refilled 311 with abrasive agent or an abrasive agent suspension from the pressurized lock chamber 21 via the refilling valve 19. On refilling 311, the delivery aid 45 is fluid-connected to the pressurized lock chamber 21 via the opened delivery aid shut-off valve 47. After the refilling 311, the delivery aid shut-off valve 47 as well as the pressurization valve 37 and the refilling valve 19 are shut off in order to be able to pressure-relieve the lock chamber 21 into the discharge 29 via the pressure relief valve 27 for the next filling step.

The pressure accumulator can be charged in pressure 313 from the high-pressure conduit 5 via the throttle 41 during the filling 307 of the lock chamber 21 or during the refilling 311 of the pressure tank 11. Starting at the same time as the pressurizing 309 of the lock chamber 21 from the pressure accumulator 39, the lock chamber 21 can be at least partly pressurized 315 from the high-pressure conduit 5 via the throttle 41. This slow throttled pressurizing 315 from the high-pressure conduit 5 can last longer than the rapid pressurizing 309 by way of the pressure discharge of the pressure accumulator 39. In other words, the pressurizing 309 of the lock chamber 21 by way of the pressure discharge of a pressure accumulator 309 can be effected during a first time window A and the pressurizing 315 of the lock chamber 21 from the high-pressure conduit 5 can be effected during a second time window B, wherein the first time window A and the second time window B at least partly overlap, preferably at their beginning.

The pressurizing 309 of the lock chamber 21 by pressure discharge of the pressure accumulator can be effected so rapidly, that abrasive agent which is located in the lock chamber 21 is loosened up by a pressure impulse. Herein, the pressurizing 309 of the lock chamber by way of pressure discharge of the pressure accumulator 39 is preferably effected in a lower region of the lock chamber 21, since any clogging of abrasive agent is more probable in a lower region than in an upper region.

Optionally, the pressurization entry 35 of the lock chamber 21 can be shut off from the pressure accumulator 39 and/or from the high-pressure conduit 5 during the filling 307 and the refilling 311. The pressurizing 313 of the pressure accumulator 39 can hence be effected during the filling 307 and/or the refilling 311. Herein, energy can be stored via a spring compression or fluid compression in the pressure accumulator 39 which can be designed for example as a spring accumulator or bubble accumulator. The filling 307, the pressurizing 309 and the refilling 311 can take their course cyclically, whereas the cutting 305 can be carried out continuously.

Optionally, after pressurizing 309 the lock chamber 21 by way of pressure discharge of the pressure accumulator 39, the pressure accumulator 39 can firstly be shut off from the high-pressure conduit 21 by way of a pressure accumulator valve 43. Preferably, the pressure accumulator valve 43 can only be opened again for charging the pressure accumulator 39 in pressure, when the lock chamber 21 has been pressurized from the high-pressure conduit 5 via the throttle 41.

Figure 14:
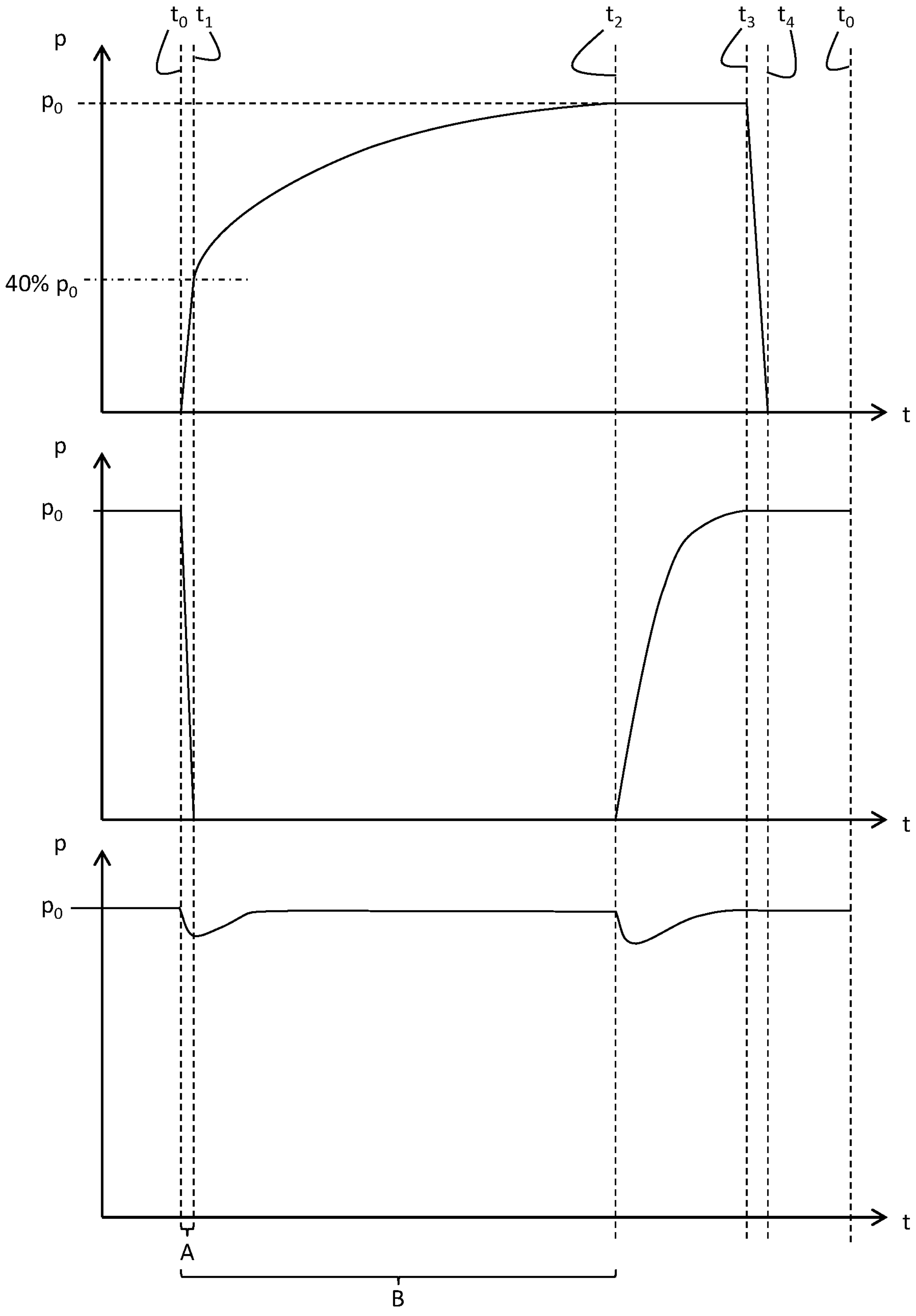
FIG. 14 is a view of pressure-time diagrams in a lock chamber, in a pressure tank and in a high-pressure conduit, according to an embodiment example of the water-abrasive suspension cutting facility which is disclosed herein.

FIG. 14 illustrates an exemplary course of the pressure p over time tin the lock chamber 21 (at the top), in the pressure accumulator 39 (in the middle) and in the high-pressure conduit 5 (at the bottom). The pressure in the non-pressurized lock chamber 21 is firstly the ambient pressure which here lies on the axis line. The lock chamber 21 can be filled 307 in this non-pressurized phase before the start of the pressuring 309 at the point in time $t_0$.

The pressurizing 309, 315 begins at the point in time $t_0$. During the first short time window $A=t_1-t_0$, the lock chamber 21 is now pressurized 309 to up to 40% of the nominal high pressure $p_0$ from the pressure discharge of the pressure accumulator 39. The pressure accumulator 39 is then relieved down to a minimum a $t_1$ and is subsequently shut off via the pressure accumulator valve 43 according to the second embodiment example in FIG. 2. The lock chamber 21 however continues to be slowly pressurized 315 within the second longer time window $B=t_2-t_0$ from the high-pressure conduit 5 via the throttle 41 until the nominal high pressure $p_0$ is reached at $t_2$. The pressurizing 309, 315 of the lock chamber 21 can last 5 to 10 seconds. The refilling 311 can begin as soon as the nominal high-pressure $p_0$ in the lock chamber 21 is reached at $t_2$ and the pressure accumulator 39 can be simultaneously charged in pressure 313 again. In the embodiment according to FIG. 3 without a pressure accumulator 39, the lock chamber 21 is completely pressurized from the high-pressure conduit 5 via the throttle 41 beyond the time window B.

The refilling valve 19 is opened between $t_2$ and $t_3$, so that abrasive agent can flow into the pressure tank 11. At the point in time $t_3$, the abrasive agent has completely flowed out of the lock chamber 21 into the pressure tank 11 and the refilling step 311 is completed. For filling 307, the pressure can be relieved from the lock chamber 21 into the discharge 29 via the pressure relief valve 27 in a relatively rapid manner until at $t_4$ lower pressure again prevails in the lock chamber 21. A new refilling cycle beginning with the filling 307 of the lock chamber 21 can then start. The pressure accumulator 39 is charged in pressure again from the high-pressure conduit 5 in a slow and throttled as possible manner from $t_2$, so as to be fully charged in pressure again at $t_0$ for the pressurizing 309. The lower graph shows the pressure drop in the high-pressure conduit 5 on opening the pressurization valve 37 at $t_0$ and the pressure accumulator valve 43 at $t_2$. The amplitude of the pressure drop in each case is reduced via the throttle 41 to an amount, with regard to which the cutting performance of the cutting jet 9 is not significantly compromised.

Figure 15A:
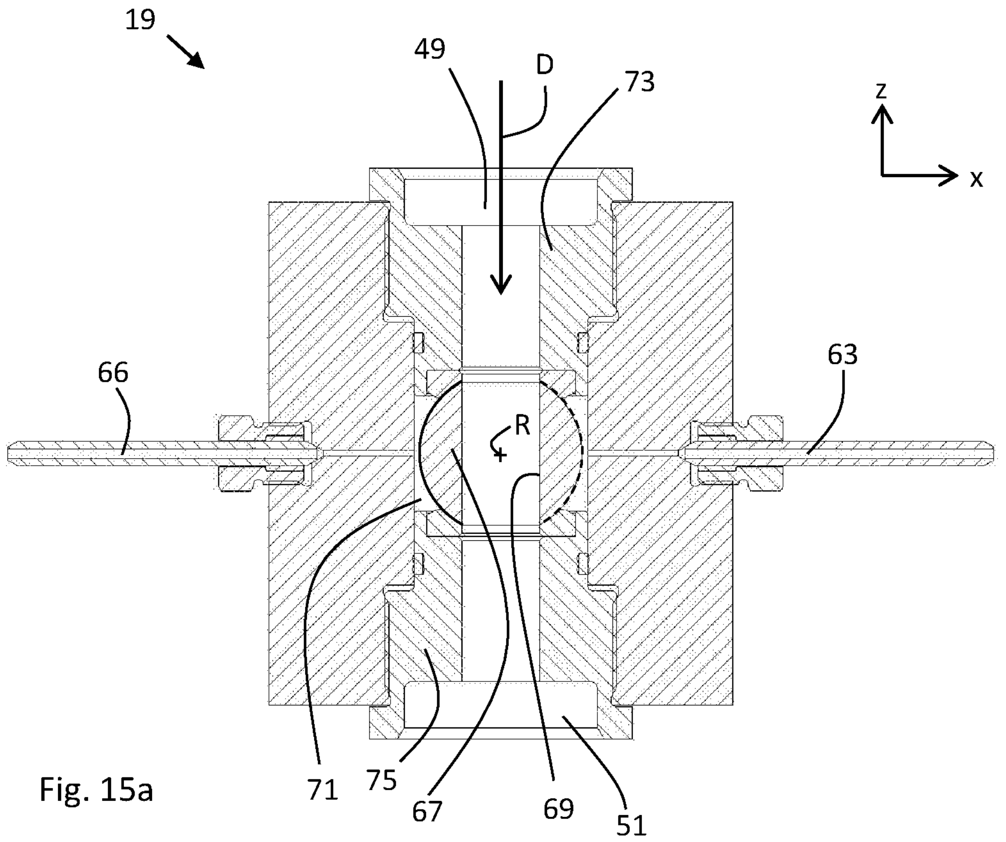
FIG. 15*a* is a cross sectional view in an xz-plane through a refilling valve in one open position, according to an embodiment example of the water-abrasive suspension cutting facility which is disclosed herein.
Figure 15B:
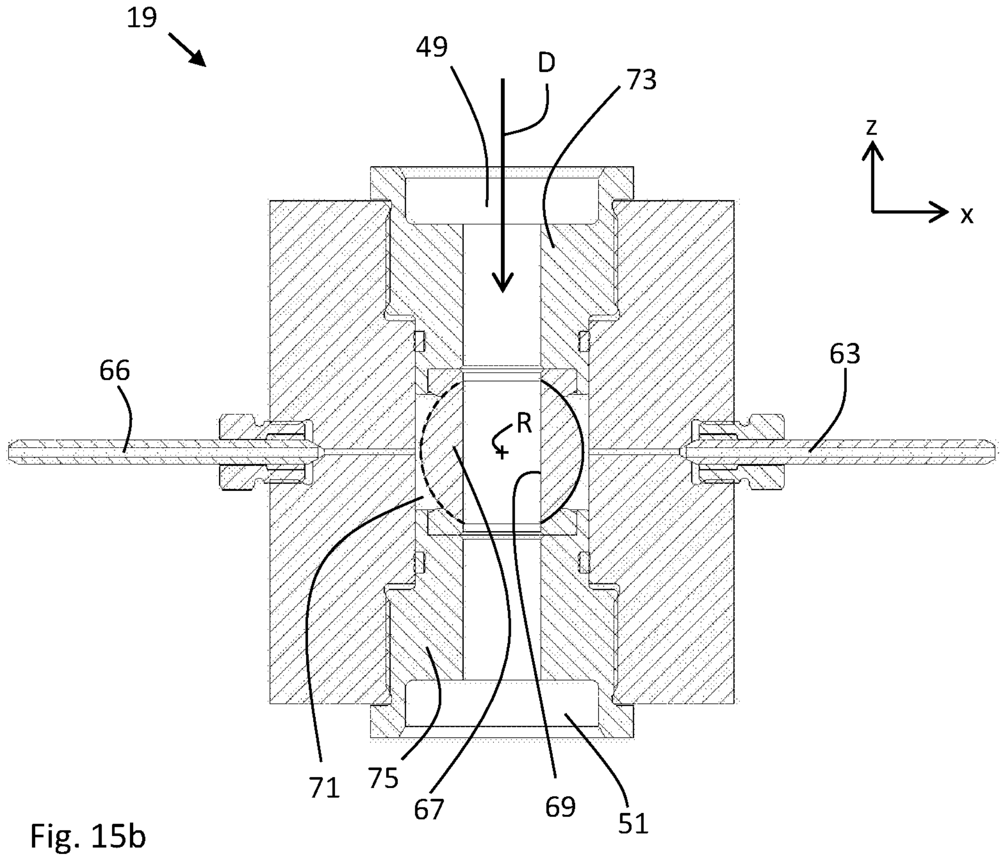
FIG. 15*b* is a cross sectional view in an xz-plane through a refilling valve in another open position, according to an embodiment example of the water-abrasive suspension cutting facility which is disclosed herein.

In FIGS. 15*a* and 15*b*, the refilling valve 19 is shown in cross section in a more detailed manner, each in different open positions. Since the refilling valve 19 needs to be actuated at high pressure at the valve entry 49 and the valve exit 51, the trouble-free actuation of the refilling valve 19 is a technical challenge. The reliable opening and closing of the refilling valve 19 is now ensured by way of four sub-aspects which each on its own or in an arbitrary combination of two, three or all four sub-aspects contribute to the refilling valve 19 not clogging or being blocked by the abrasive agent.

The refilling valve 19 which is preferably designed as a ball cock has a vertical throughflow direction D from the top to the bottom and comprises a centrally arranged valve body 67 with spherical outer surfaces, said valve body being rotatable about a rotation axis R which is perpendicular to the throughflow direction D. The valve body 67 comprises a centric through-hole 69 which in the open positions which are shown in FIG. 15*a* and FIG. 15*b* runs parallel to the throughflow direction D and perpendicular to the rotation axis R. The first open position according to FIG. 15*a* differs from the second open position according to FIG. 15*b* in that the valve body 67 is rotated by 180° with respect to the rotation axis R. The valve body 67 is seated in a valve space 71 between an upper valve seat 73 and a lower valve seat 75. The upper valve seat 73 forms the valve entry 49 and the lower valve seat 75 the valve exit 51 The upper valve seat 73 and the lower valve seat 75 are arranged coaxially to one another and to the vertical throughflow direction D. The valve space 71 can be purged via the lateral purge inlet 66 and via the purge outlet 63 which lies diametrically opposite the purge inlet 66, preferably given a completely pressureless refilling valve 19.

Figure 16A:
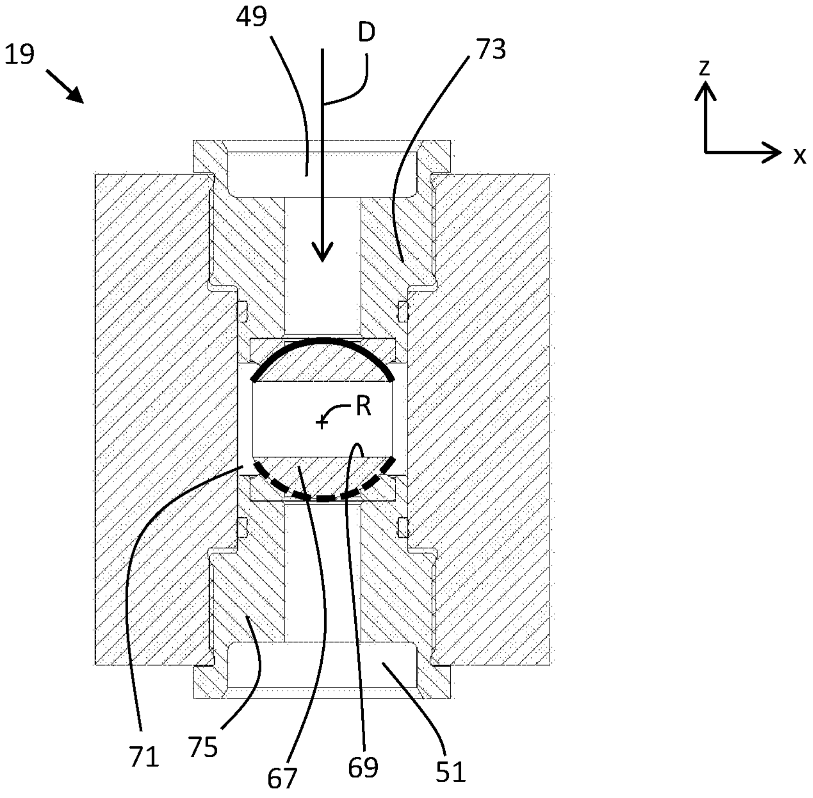
FIG. 16*a* is a cross sectional view in an xz-plane through a refilling valve in one closure position, according to an embodiment example of the water-abrasive suspension cutting facility which is disclosed herein.
Figure 16B:
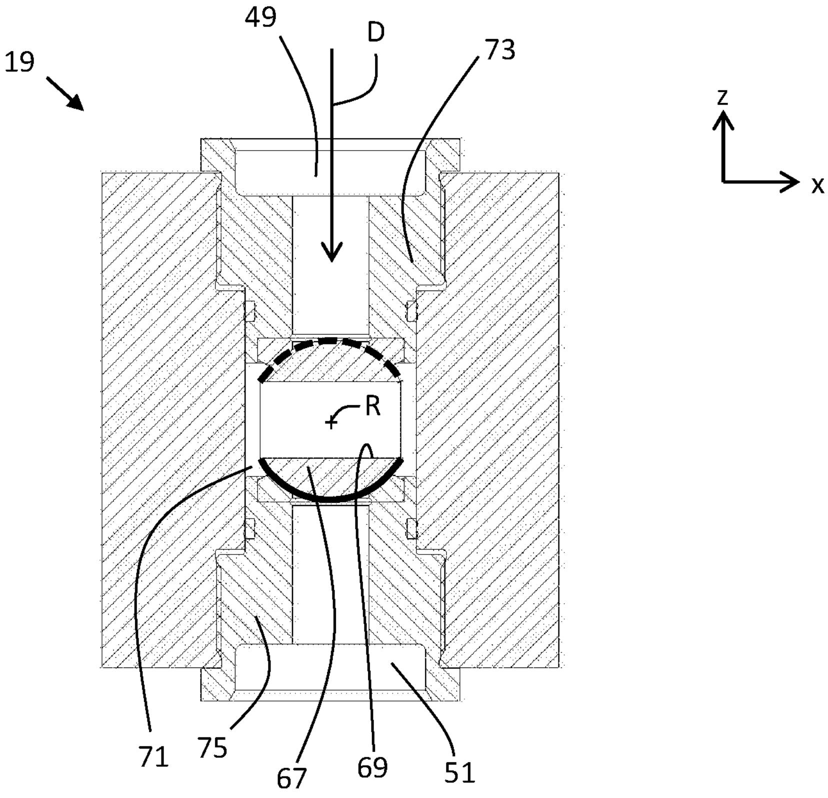
FIG. 16*b* is a cross sectional view in an xz-plane through a refilling valve in another closure position, according to an embodiment example of the water-abrasive suspension cutting facility which is disclosed herein.

According to the first sub-aspect, the refilling valve 19 is in the position of assuming a first closure position (FIG. 16*a*), a first open position (15*a*) and a second open position (FIG. 15*b*), wherein in the first closure position (FIG. 16*a*) the lock chamber 21 is fluid-separated from the pressure tank 11 and in the first and well as the second open position (FIG. 15*a*-*b*) the lock chamber 21 is fluid-connected to the pressure tank 11. The first open position and the second open position can hardly be differentiated from one another due to the symmetry of the valve body 67. The valve body 67 can be rotated about the rotation axis R in one direction to an infinite extent, so that a reversal of the rotation direction is basically not necessary and the valve body 67 can be activated exclusively in one rotation direction, inasmuch as the torque which is required for this does not exceed a certain threshold. The first closure position of FIG. 16*a* here lies at 90 between the first open position and the second open position. In this case, there is also a second closure position (see FIG. 16*b*) which is rotated about the rotation axis R by 180° with respect to the first closure position. In the closure positions which are shown in FIG. 16*a* and FIG. 16*b* the through-hole 69 runs perpendicularly to the throughflow direction D as well as perpendicularly to the rotation axis R, so that the valve body 67 seals off the valve entry 49 on the upper valve seat 73 and the valve exit 51 on the lower valve seat 75. Here the optional purge inlet 66 and purge outlet 63 are not shown, but can be provided. Herewith, there are therefore always two possibilities for movement direction, of opening and closing the refilling valve 19 towards the first open position/closure position respectively or to the second open position/closure position respectively, should one movement direction momentarily demand too high a torque. If therefore one movement direction is clogged or blocked, then the valve body 67 can be moved in the other movement direction and the valve 19 can be brought into the other open position/closure position. Herein, the clogging or blockage can be released by the reversal as a positive auxiliary effect, so that the previously blocked movement direction is free again given the next actuation. The refilling valve 19 can also be shaken free by way of a repeated to and fro rotation, for example should the valve body 67 be difficult to actuate in both movement directions.

Figure 17A:
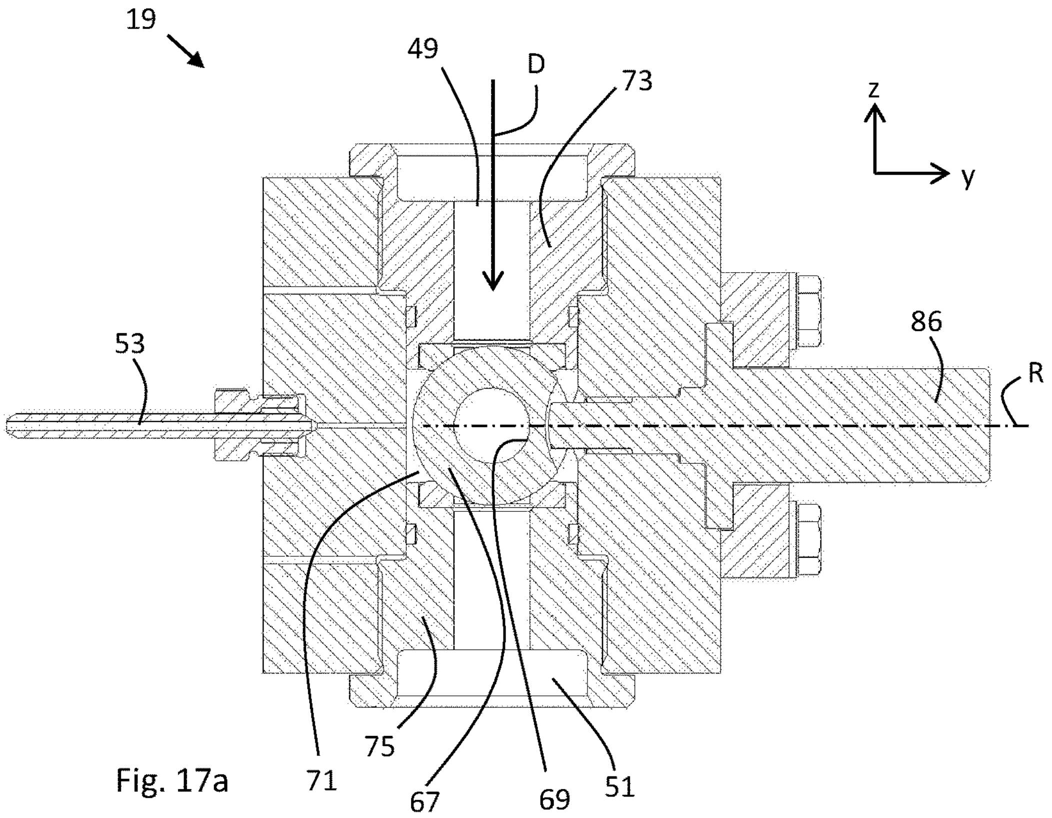
FIG. 17*a* is a cross sectional view in a yz-plane through a refilling valve in a closure position, according to one embodiment example of the water-abrasive suspension cutting facility which is disclosed herein.
Figure 17B:
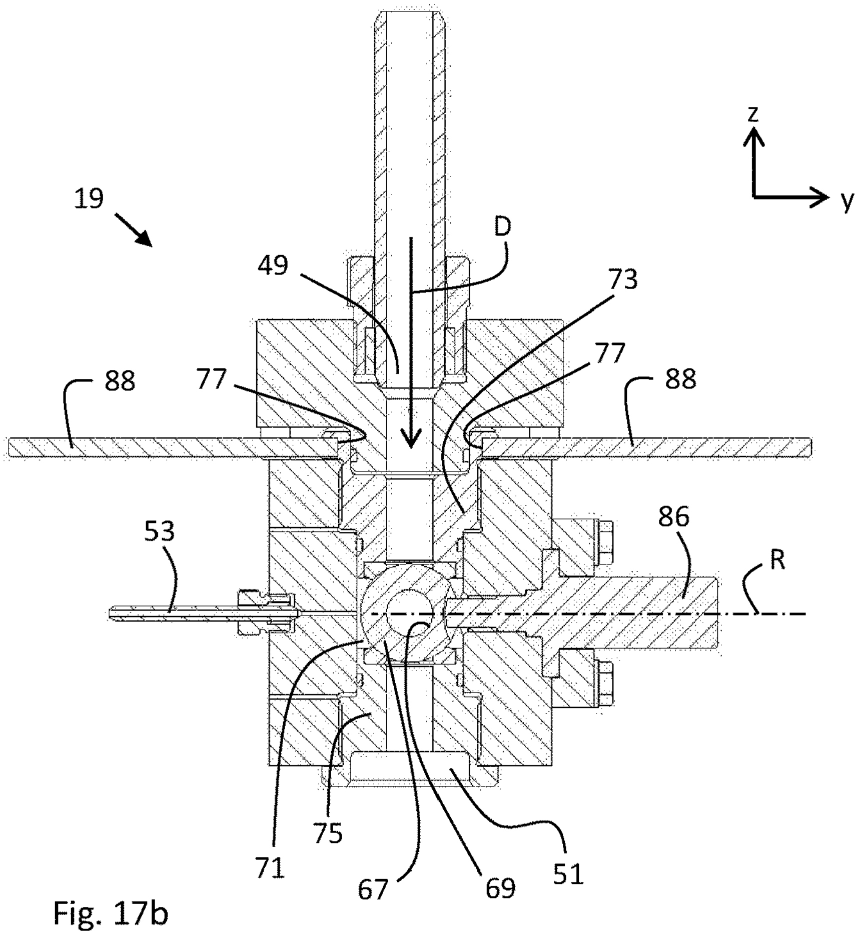
FIG. 17*b* is a cross sectional view in a yz-plane through a refilling valve in a closure position, according to another embodiment example of the water-abrasive suspension cutting facility which is disclosed herein.

According to the second sub-aspect, the valve space 71 can be pressurized in a closure position of the valve body 67. For this, according to FIG. 17*a*-*b*, the valve space 71 comprises the pressure inlet 53, via which the valve space 71 can be pressurized in a closure position of the valve body 67. The pressure inlet 53 here is arranged in the yz-plane coaxially to a servomotor shaft 86 in a manner lying opposite this. Alternately to this, the pressure inlet 53 can also lie in the xz-plane which is perpendicular thereto and possibly be used as a purge inlet 66 when required. The valve body 67 is rotated about the rotation axis R via the servomotor shaft 86. On starting operation or restarting operation of the facility 1 which is firstly without pressure, the valve space 71 is initially pressureless. If the pressure tank 11 and the lock chamber 21 are then pressurized to about 2,000 bar, then the valve body 67 can be jammed in by the valve seats 73 75 due to the high pressure at the entry side as well as exit side given a simultaneous low pressure in the valve space 71 and can be difficult to move or not able to move at all. By way of the pressure inlet 53, the pressure difference between the valve space 71 and the valve entry 49 or the valve exit 51 can be largely reduced on starting operation, so that the valve body 67 is not jammed by the high pressure. In FIG. 17*b*, the upper valve seat 73 is shown in an adjustable manner via an adjusting device, in accordance with the fourth sub-aspect. The upper valve seat 73 is herein positionable in the z-direction via an outer thread by way of a rotation about the throughflow direction D. The rotation can be carried out manually by way of levers 88 which engage from the outside into engagement surfaces 77 or in a motor-driven manner.

According to the third sub-aspect, the valve space can be purged as is shown for example in FIG. 15*a-b*. Herein, the refilling valve comprises the purge inlet 66 and the purge outlet 63, via which the valve space 71 can be purged. The pressure inlet 53 can herein selectively serve as a purge inlet 66. This is particularly advantageous in combination with the second sub-aspect of a pressure inlet 53, since a purging procedure can be carried out given a pressureless valve space 71 or a completely pressureless facility 1 and subsequently on restarting operation of the facility 1, the valve space 71 can be pressurized again via the pressure inlet 53, so that the valve body 67 does not become jammed due to the high pressure.

Figure 18A:
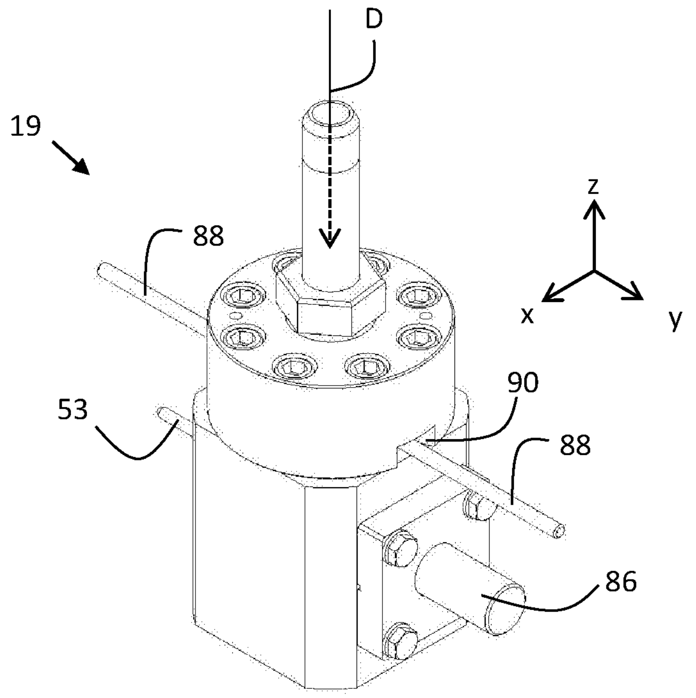
FIG. 18*a* is a perspective view of a refilling valve according to an embodiment example of the water-abrasive suspension cutting facility which is disclosed herein.
Figure 18B:
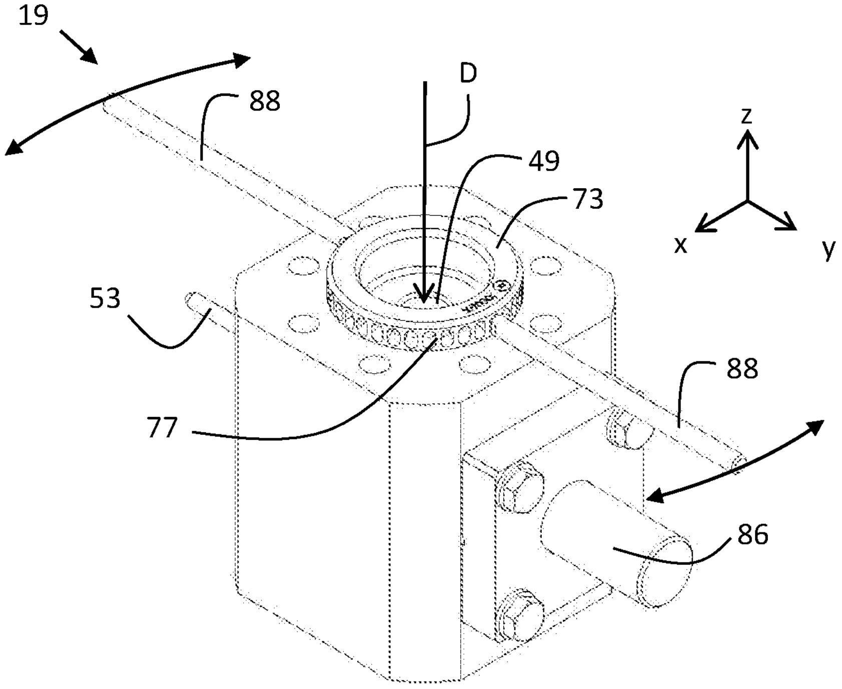
FIG. 18*b* is a perspective view of a refilling valve according to an embodiment example of the water-abrasive suspension cutting facility which is disclosed herein.

According to the fourth sub-aspect, the refilling valve comprises the entry-side upper valve seat 73 and the exit-side lower valve seat 75, wherein at least one of the valve seats 73, 75 is adjustable, so that the distance of the valve seats 73, 75 to one another can be adjusted. The refilling valve 19 can hence be adjusted in an optimal manner, in order on the one hand to be sealed and on the other hand not to block. On starting operation of the facility, given temperature fluctuations, given a stubborn blockage due to abrasive agent and/or material wear, a readjustment of the distance of the valve seats 73, 75 to one another can be advantageous. In order not to have to switch off or disassemble the facility for this, a tool opening 90, through which a tool in the form of a lever 88 can engage in order to adjust the at least one adjustable valve seat 73, can be provided as is shown in FIG. 18*a*. Preferably however, the adjustment of the valve seat 73 is carried out in a service procedure given a pressureless facility 1. In this example, the upper entry-side valve seat 73 is axially adjustable along the throughflow direction D via an outer thread. Levers 88 can be applied from the outside onto engagement surfaces 77 (see FIG. 18*b*) which are arranged at the peripheral side, in order to rotate the valve seat 73. The refilling valve 19 does not therefore need to be separated or disassembled from the facility 1. The operating person can hence immediately manually intervene, in order to ensure a continuous operation or to switch off or depressurize the facility 1, in order to carry out the adjustment of the valve seat 73 as a service procedure. Alternatively or additionally, the readjusting can also be effected in an automatically controlled and/or regulated manner via a motor.

The valve body 67 is preferably rotated about the rotation axis R in a controlled manner via a servomotor which is not represented. Herein, the possibly measured torque or power uptake of the motor can be monitored, so that the rotation direction can be reversed to the other open position or closure position on exceeding a threshold value. Alternatively or additionally, torque or power peaks can be recorded over a certain time period and an error occurrence or maintenance case can be signalized on the basis of this recording. For example, the necessity for readjusting the valve seat 73 can be displayed.

Figure 19A:
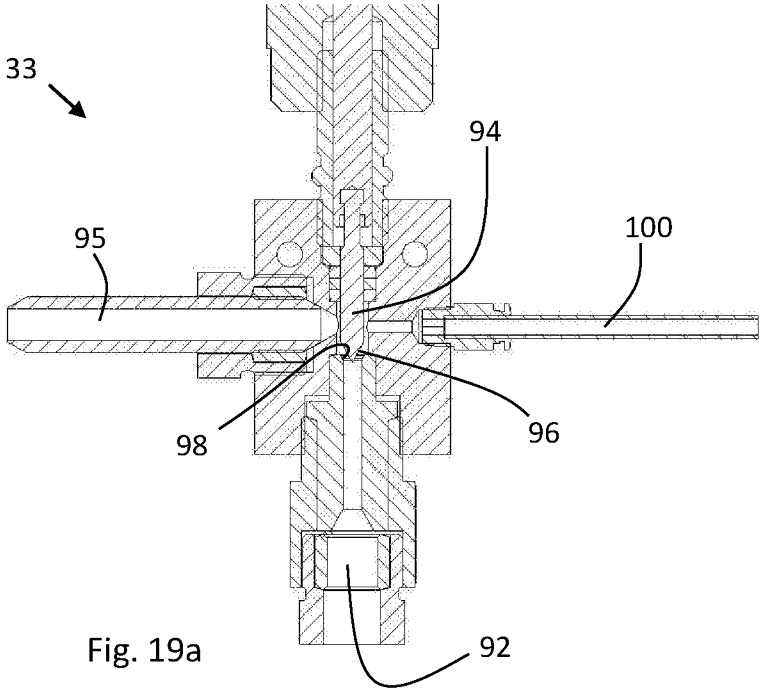
FIG. 19*a* is a cross sectional view through a shut-off valve in the form of a needle valve according to one embodiment example of the water-abrasive suspension cutting facility which is disclosed herein, in an open position.
Figure 19B:
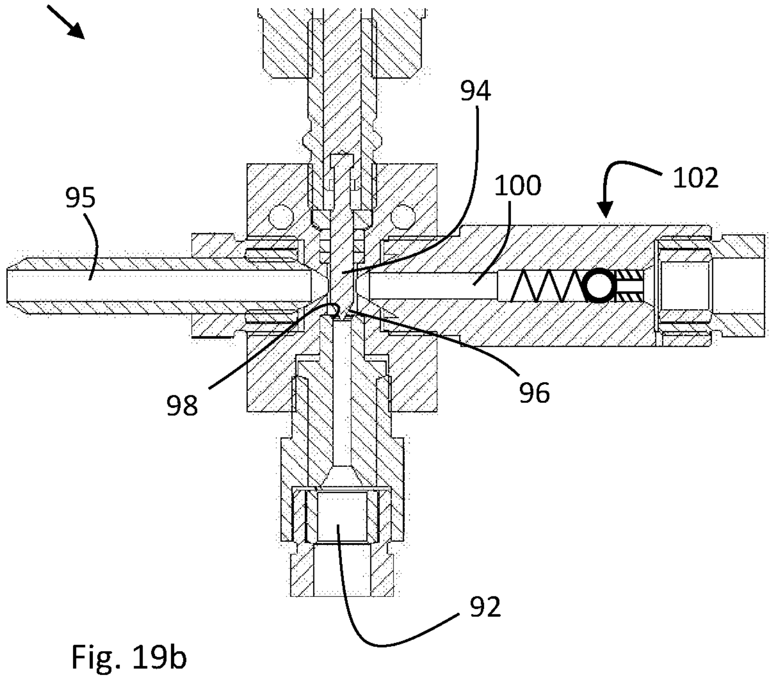
FIG. 19*b* is a cross sectional view through a shut-off valve in the form of a needle valve according to another embodiment example of the water-abrasive suspension cutting facility which is disclosed herein, in an open position.

FIG. 19*a-b* show two embodiments of purgable needle valves which can be used for example as one or more of the shut-off valves 15, 27, 33, 37, 47 or at another location in the facility 1. The needle valve according to FIG. 19*a* is preferably applied where the needle valve does not need to open or close under high pressure, e.g. as a pump shut-off valve 33 in the circuit for assisting in the filling of the lock chamber 21. The pump shut-off valve 33 herein comprises a high-pressure entry 92 which with a needle 94 which is arranged coaxially to the high-pressure entry 92 and is axially positionable can be shut off with respect to a low-pressure exit 95. The needle 94 at an end which faces the high-pressure entry 92 comprises a conical closure surface 96 which can be pressed against a valve seat 98 for shutting off. As soon as the high-pressure entry 92 is shut off, one can apply high pressure to the high-pressure entry 92 without this escaping via the low-pressure exit 95. If no high pressure prevails at the high-pressure entry 92, then the pump shut-off valve 33 can be opened in order to permit a throughflow from the high-pressure entry 92 to the low pressure exit 95 given low pressure.

The needle valve according to FIG. 19*a-b* also comprises a purge inlet 100, via which the opened needle valve can be purged, wherein purging fluid, i.e. water or water with cleaning additives can flow out via the low-pressure exit 95. In particular, the valve seat 98 and the closure surface 96 can be freed of abrasive agent residues by way of the throughflow of purging fluid, in order to ensure a clean closure amid as little material wear as possible. Preferably, the needle valve can be purged shortly before a closure procedure of the refilling valve 19. FIG. 19*b* shows a needle valve with a check valve 102 at the purge inlet 100. The check valve 102 prevents a backlog into the purge inlet 100 and only permits a flow of purging fluid in the direction of the needle valve. This is useful if the needle valve is used for example as one or more of the shut-off valves 15, 27, 37, 47, since the valve is opened there when high pressure prevails at the high-pressure entry 92. Without the check valve 102, this high pressure would at least partly discharge into the purge inlet 100 and lead to a backlog into the purge inlet 100. The check valve 102 prevents this and hence permits a clean pressure relief via the low-pressure exit 95. The low-pressure exit 95 can also be a high-pressure exit 95 in this case. For example, the low-pressure exit 95 is connected to a discharge 29 in the case of a pressure relief valve 27. In the case of the pressurization valve 37, the high-pressure exit 95 is however connected to the pressurization entry 35 of the lock chamber 21, in order to subject this to high pressure.

The needle valves are preferably operated pneumatically via a pressing disc (not shown). In order to be able to counteract the high pressure which acts upon the needle tip in the form of a conical closure surface 96, an air pressure can be applied onto the very much larger pressing disc, so that the needle valve can be closed and held in a sealed manner against a high pressure of 1,500 bar and more with a few bars of air pressure.

The numbered indications of the components or movement directions as “first”, “second”, “third” etc. have herein been selected purely randomly so as to differentiate the components or the movement directions amongst one another, and can also be selected in an arbitrarily different manner. Hence these entail no hierarchy of significance.

While specific embodiments of the invention have been shown and described in detail to illustrate the application of the principles of the invention, it will be understood that the invention may be embodied otherwise without departing from such principles.

The invention claimed is:

1. A water-abrasive suspension cutting facility, comprising:

a high-pressure source for providing water at a high pressure;

a high-pressure conduit connected to the high-pressure source;

a pressure tank for providing an abrasive agent suspension, the abrasive agent suspension being at the high pressure;

a lock chamber configured to temporarily be at the high pressure and temporarily at a low pressure;

a filling valve for filling the lock chamber when the lock member is at the low pressure;

a pump connected at a suction side and fluidly-connected to the lock chamber and capable of being shut off, wherein the pump is configured to be shut off in a manner such that, given the high pressure in the lock chamber, the pump is shut off from the lock chamber, and, given low pressure in the lock chamber, the pump is configured to suck an abrasive agent suspension through the filling valve and into the lock chamber.

2. A water-abrasive suspension cutting facility according to claim 1, wherein a pump shut-off valve is arranged between the pump and the lock chamber.

3. A water-abrasive suspension cutting facility according to claim 2, wherein the pump shut-off valve is a needle valve.

4. A water-abrasive suspension cutting facility according to claim 2, wherein the pump shut-off valve is configured to be purged.

5. A water-abrasive suspension cutting facility according to claim 1, wherein the pump is connected at a delivery side to a refilling funnel, the refilling funnel being fluid-connected at an exit side to an entry side of the filling valve.

6. A water-abrasive suspension cutting facility according to claim 1, wherein the pump at the suction side is fluid-connected to an upper region of the lock chamber in a manner capable of being shut off.

7. A water-abrasive suspension cutting facility according to claim 1, wherein the pump is a membrane pump.

8. A water-abrasive suspension cutting facility according to claim 1, wherein the lock chamber is configured to be relieved of pressure via a pressure relief valve, the pressure relief valve comprising a purgable needle valve.

9. A water-abrasive suspension cutting facility according to claim 8, wherein the pressure relief valve comprises a check valve at a purge inlet.

10. A method for water-abrasive suspension cutting, the method comprising the steps:

providing water at a high pressure in a high-pressure conduit by a high-pressure source;

providing an abrasive agent suspension, the abrasive agent suspension being at a high pressure in a pressure tank;

cutting a material by a high-pressure jet amid removal of the abrasive agent suspension from the pressure tank, the high-pressure jet at least partly comprising the abrasive agent suspension;

filling a lock chamber, which is at a low pressure, with abrasive agent amid at least temporal sucking of the abrasive agent suspension into the lock chamber by a pump, the pump being configured to be shut off from the lock chamber;

shutting off the pump from the lock chamber;

pressurizing the lock chamber to a high pressure; and refilling the pressure tank with the abrasive agent from the lock chamber, which is at the high pressure, into the pressure tank.

11. A method according to claim 10, wherein shutting-off the pump from the lock chamber is effected by a pump shut-off valve, the pump shut-off valve comprising a needle valve.

12. A method according to claim 11, further comprising purging the pump shut-off valve, the pump shut-off valve being arranged between the pump and the lock chamber.

13. A method according to claim 10, further comprising purging a pump shut-off valve, the pump shut-off valve being arranged between the pump and the lock chamber.

14. A method according to claim 10, wherein filling the lock chamber, shutting-off the pump from the lock chamber, pressurizing the lock chamber and refilling the pressure tank are carried out successively and cyclically during cutting of the material.

15. A method according to claim 10, further comprising relieving pressure of the lock chamber from the high pressure to the low pressure after refilling the pressure tank.

16. A method according to claim 15, wherein the pressure relief is effected into a discharge via a pressure relief valve, the pressure relief valve comprising a purgable needle valve.

* * * * *